US012587445B2

(12) United States Patent
Yamamoto et al.

(10) Patent No.: US 12,587,445 B2
(45) Date of Patent: Mar. 24, 2026

(54) COMPUTER SYSTEM AND CONTROL METHOD FOR DISTRIBUTED TRANSACTION

(71) Applicant: Hitachi, Ltd., Tokyo (JP)

(72) Inventors: Nobuyuki Yamamoto, Tokyo (JP); Jumpei Nishitani, Tokyo (JP); Naoshi Maniwa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/591,084

(22) Filed: Feb. 29, 2024

(65) Prior Publication Data

US 2025/0106103 A1 Mar. 27, 2025

(30) Foreign Application Priority Data

Sep. 21, 2023 (JP) ................................. 2023-154171

(51) Int. Cl.
*H04L 9/38* (2006.01)
*H04L 41/0816* (2022.01)
(52) U.S. Cl.
CPC ............................... *H04L 41/0816* (2013.01)
(58) Field of Classification Search
CPC ......... H04L 41/0816; H04L 9/38; H04L 9/46; H04L 11/14; H04L 16/23
USPC ........................................................ 709/223
See application file for complete search history.

(56) References Cited

U.S. PATENT DOCUMENTS

2013/0042146 A1* 2/2013 Unger ................. G06F 11/3672
714/E11.178
2021/0365332 A1* 11/2021 Wang ................. G06F 11/1474

2023/0095620 A1* 3/2023 Wang ................. G06F 11/1469
714/2
2023/0104129 A1* 4/2023 Miriyala ................. H04L 69/03
709/220
2023/0106531 A1* 4/2023 Henkel ................. G06F 9/5072
709/223
2023/0107891 A1* 4/2023 Miriyala ............. G06F 9/45558
370/254
2023/0195582 A1* 6/2023 Fleckenstein ....... G06F 16/2365
707/684

FOREIGN PATENT DOCUMENTS

JP 2015-514247 A 5/2015
WO 2013/138770 A1 9/2013

OTHER PUBLICATIONS

Google Scholar History.*

* cited by examiner

*Primary Examiner* — Jude Jean Gilles
(74) *Attorney, Agent, or Firm* — MATTINGLY & MALUR, PC

(57) ABSTRACT

A computer system comprises a plurality of service execution systems each configured to execute a service for implementing an application that executes a distributed transaction. At least one of the plurality of service execution systems is configured to generate determination information for determining whether rollback of the distributed transaction is required and to transmit the determination information to another one of the plurality of service execution systems, and the another one of the plurality of service execution systems that has received the determination information is configured to determine, through use of the determination information, whether the rollback of the distributed transaction is required.

13 Claims, 22 Drawing Sheets

|     401      |     402      |      403       | 400 |
| :---------: | :---------: | :-----------: |
| TRANSACTION ID | SERVICE ID | CALL FLAG |
| T1 | S1 | FIRST TIME |
| T1 | S1 | CONTINUING |
| T1 | S1 | FIRST TIME |

| TRANSACTION ID | SERVICE ID | INSTANCE ID | NUMBER OF TIMES OF START |
|:---:|:---:|:---:|:---:|
| 801 | 802 | 803 | 804 |
| T1 | S1 | S1_I1 | 1 |
| T1 | S1 | S1_I1 | 2 |

1901   1902   1903   1900

| PATH GENERATION | TRANSACTION GENERATION | PATH INFORMATION |
|---|---|---|
| 1 | 3 | Path_1 |

| PATH GENERATION | TRANSACTION GENERATION | PATH INFORMATION |
|---|---|---|
| 1 | 3,4 | Path_1 |

| PATH GENERATION | TRANSACTION GENERATION | PATH INFORMATION |
|---|---|---|
| 1 | 3 | Path_1 |
| 4 |  | Path_2 |

| PATH GENERATION | TRANSACTION GENERATION | PATH INFORMATION |
|---|---|---|
| 1 | 3 | Path_1 |
| 4 | 5 | Path_2 |

*FIG. 19D*

|   2201   |   2202   |   2203   |   2200   |
|---|---|---|---|
| START PATH GENERATION | END PATH GENERATION | INSTANCE ID | |
| 2 | ∞ | S1_I1,S1_I2 | |

| 2201 | 2202 | 2203 | 2200 |
|---|---|---|---|
| START PATH GENERATION | END PATH GENERATION | INSTANCE ID | |
| 2 | 3 | S1_I1,S1_I2 | |
| 4 | ∞ | S1_I1,S1_I2,S1_3 | |

COMPUTER SYSTEM AND CONTROL METHOD FOR DISTRIBUTED TRANSACTION

CROSS-REFERENCE TO RELATED APPLICATION

The present application claims priority from Japanese patent application JP 2023-154171 filed on Sep. 21, 2023, the content of which is hereby incorporated by reference into this application.

BACKGROUND OF THE INVENTION

This invention relates to a technology for detecting inconsistency of data in an application that executes a distributed transaction.

In recent years, a microservice which couples a plurality of services to implement one application has widely been used. In the microservice, it is known that maintenance of consistency of data by the distributed transaction is difficult. To address this problem, the TCC pattern and the Saga pattern are known.

In a case where the service restarts, information on a transaction relating to this service is lost. It is thus difficult to handle this situation with the related art. To address this, there is known a technology as described in JP 2015-514247 A.

In JP 2015-514247 A, the following is described: "Systems and methods are provided for supporting transaction recovery based on inline delegation of transaction logs to a database. The system can retrieve transaction recovery information of a transaction from a persistence store, wherein the transaction recovery information is persisted on a resource manager that is associated with the persistence store during a prepare phase. Furthermore, the system can retrieve one or more in-doubt transactions from one or more participating resource managers of the transaction. Then, the system can determine whether to commit or roll back the one or more in-doubt transactions by matching the one or more in-doubt transactions to the transaction recovery information."

SUMMARY OF THE INVENTION

With the technology as described in JP 2015-514247 A, it is required to store the transaction recovery information, and hence this information is possibly lost in a case where a failure occurs in the resource manager. This invention provides a technology for detecting inconsistency of data caused by a restart of a service in an application that executes a distributed transaction.

A representative example of the present invention disclosed in this specification is as follows: a computer system comprises a plurality of service execution systems each configured to execute a service for implementing an application that executes a distributed transaction. At least one of the plurality of service execution systems is configured to generate determination information for determining whether rollback of the distributed transaction is required and to transmit the determination information to another one of the plurality of service execution systems, and the another one of the plurality of service execution systems that has received the determination information is configured to determine, through use of the determination information, whether the rollback of the distributed transaction is required.

According to the at least one embodiment of this invention, it is possible to detect the inconsistency of data caused by the restart of the service in the application that executes the distributed transaction. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 19A, FIG. 19B, FIG. 19C, and FIG. 19D are tables for showing an example of path management information in the fifth embodiment;

DETAILED DESCRIPTION OF THE PREFERRED EMBODIMENTS

Figure 1:
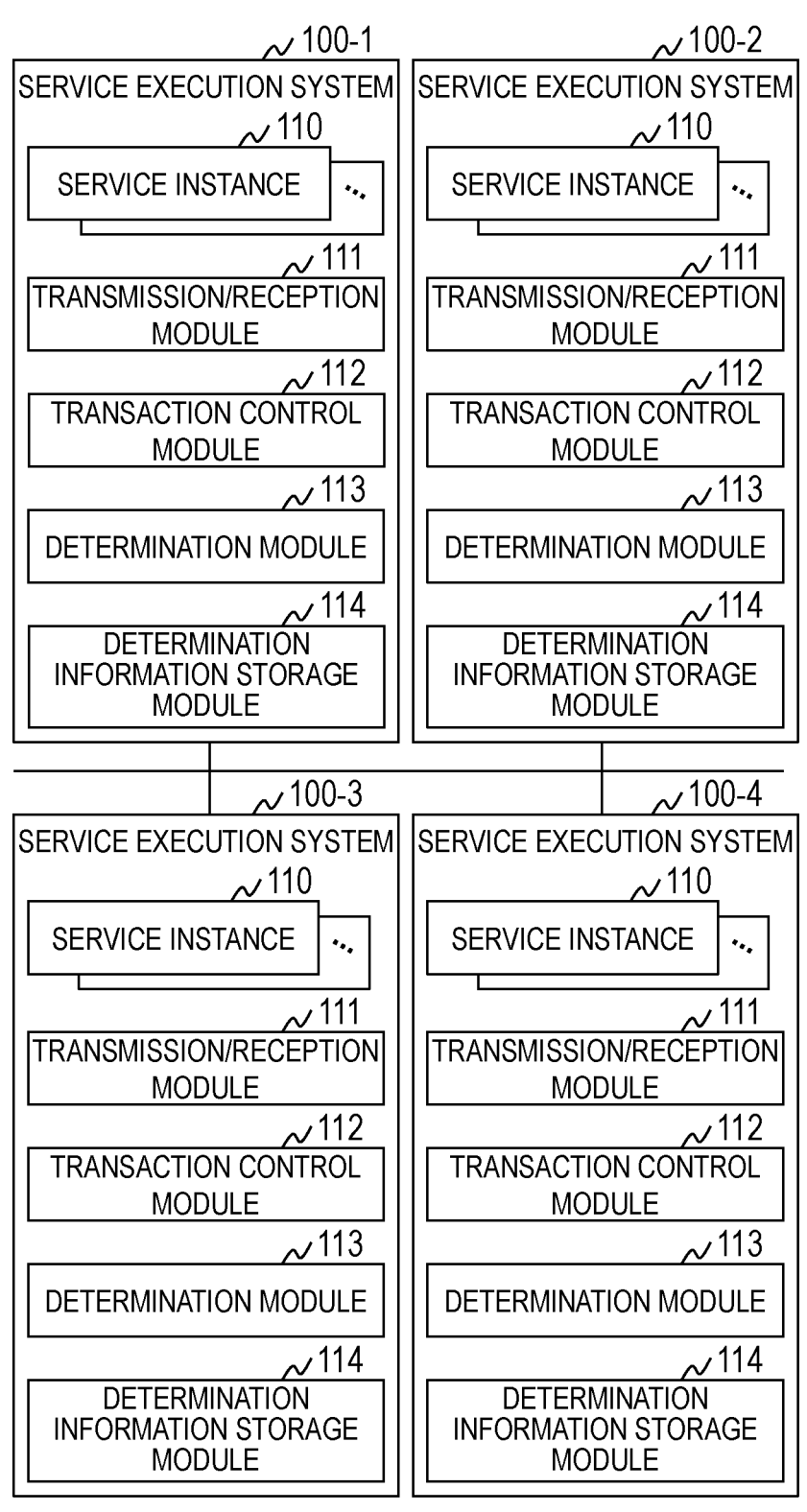
FIG. 1 is a diagram for illustrating an example of a configuration of a system according to a first embodiment of this invention.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first", "second", and "third" herein are assigned to distinguish between components, and do not necessarily limit the number or order of those components.

First Embodiment

Figure 2:
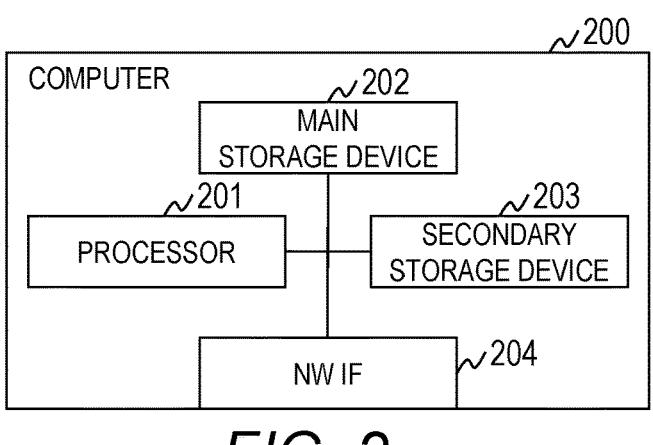
FIG. 2 is a diagram for illustrating an example of a hardware configuration of a computer forming a service execution system in the first embodiment.

FIG. 1 is a diagram for illustrating an example of a configuration of a system according to a first embodiment of this invention. FIG. 2 is a diagram for illustrating an example of a hardware configuration of a computer forming a service execution system 100 in the first embodiment.

The system is formed of a plurality of service execution systems 100. The service execution systems 100 are coupled to one another via a network such as a local area network (LAN) or a wide area network (WAN).

The service execution system 100 is a system that executes a service forming an application, and is formed of, for example, a computer 200 of FIG. 2. The computer 200 includes a processor 201, a main storage device 202, a secondary storage device 203, and a network interface 204. The service execution system 100 includes service instances 110, a transmission/reception module 111, a transaction control module 112, a determination module 113, and a determination information storage module 114. The service execution system 100 is coupled to a database (not shown).

The service instance 110 is an entity that executes the service. The plurality of service instances 110 operate for load balancing for the service execution system 100. In the first embodiment, it is assumed that the number of service instances 110 is fixed.

The transmission/reception module 111 controls reception of a request, transmission of a processing result, and the like. The transaction control module 112 controls a local transaction forming a distributed transaction. The determination module 113 detects inconsistency of data in the distributed transaction. The determination information storage module 114 stores information used by the determination module 113.

Figure 3:
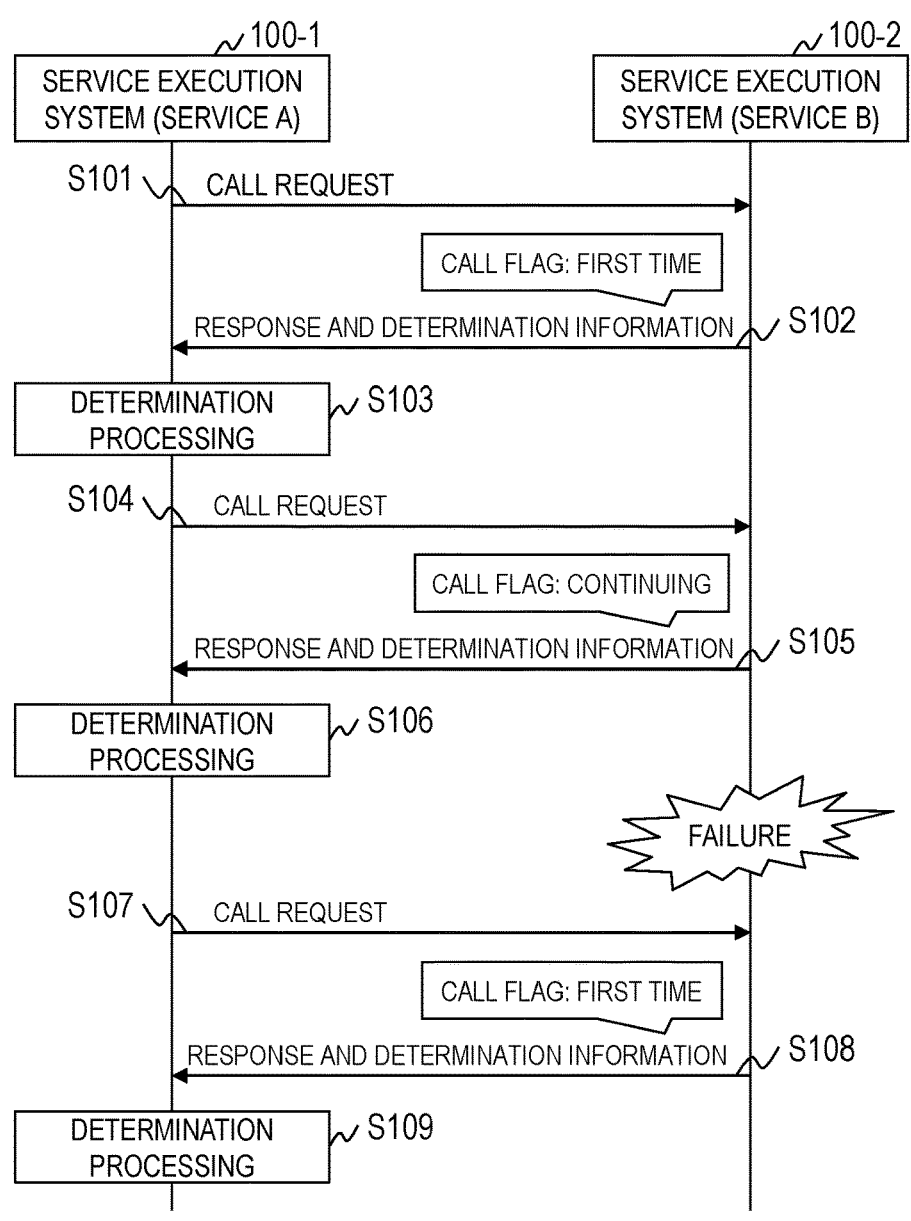
FIG. 3 is a sequence diagram for illustrating a flow of processing of a distributed transaction in the system according to the first embodiment.

FIG. 3 is a sequence diagram for illustrating a flow of processing of the distributed transaction in the system according to the first embodiment.

A service execution system 100-1 which executes a service A transmits a call request to a service execution system 100-2 which executes a service B as a result of the start of the distributed transaction (S101). The call request includes identification information on the distributed transaction and identification information on the service (service B).

The call request is controlled such that the call request is transmitted to any service instance 110 by the transmission/reception module 111. This is because in a case where a plurality of the same services are called in the distributed transaction, the same service instance 110 is required to execute processing in order to maintain consistency of the processing. A mechanism for calling the same service instance 110 is referred to as "affinity."

As the method of calling the same service instance 110, for example, there exist a method of using path information associating an identifier of the distributed transaction and identification information on the service instance 110 to be called and a method of using hash value calculation.

The service execution system 100-2 transmits a response and determination information to the service execution system 100-1 after the execution of the service (S102).

In the first embodiment, a call flag indicating a call state of the service, the identification information on the service, and the identification information on the distributed transaction are transmitted as the determination information. In a case where the call request is received for the first time, a call flag of "first time" is transmitted. In a case of a second or subsequent call request, a call flag of "continuing" is transmitted.

In a case where the service execution system 100-1 receives the response and the determination information, the service execution system 100-1 executes determination processing for determining whether or not rollback of the distribution transaction as a result of a restart of the service execution system 100-2 is required (S103). Details of the determination processing are described later. It is determined here that the rollback is not required.

The service execution system 100-1 transmits the call request to the service execution system 100-2 in the same distributed transaction (S104).

The service execution system 100-2 transmits the response and the determination information to the service execution system 100-1 after the execution of the service (S105). The call flag of "continuing" is transmitted here.

In a case where the service execution system 100-1 receives the response and the determination information, the service execution system 100-1 executes the determination processing (S106). It is determined here that the rollback is not required.

The service execution system 100-2 receives the call request in the same distributed transaction from the service execution system 100-1 after an occurrence of a failure and a restart (S107). In this case, the service execution system 100-2 transmits the response and the determination information to the service execution system 100-1 after the execution of the service (S108). The service execution system 100-2 has restarted, and hence determines that the call request is received for the first time. Thus, the service execution system 100-2 transmits the call flag of "first time."

In a case where the service execution system 100-1 receives the response and the determination information, the service execution system 100-1 executes the determination processing (S109). It is determined here that the rollback is required.

In a case of a distributed transaction in which three or more services are called, the determination information transmitted by each service execution system 100 is transferred to a service execution system 100 being a start point. Specifically, the determination information storage module 114 of each service execution system 100 records the determination information received from another service execution system 100, and the transmission/reception module 111 transmits, after the execution of the service, the determination information on this service execution system 100 and the determination information recorded by the determination information storage module 114. After that, the service execution system 100 being the start point executes the determination processing for each service execution system 100.

Figures 4, 5:
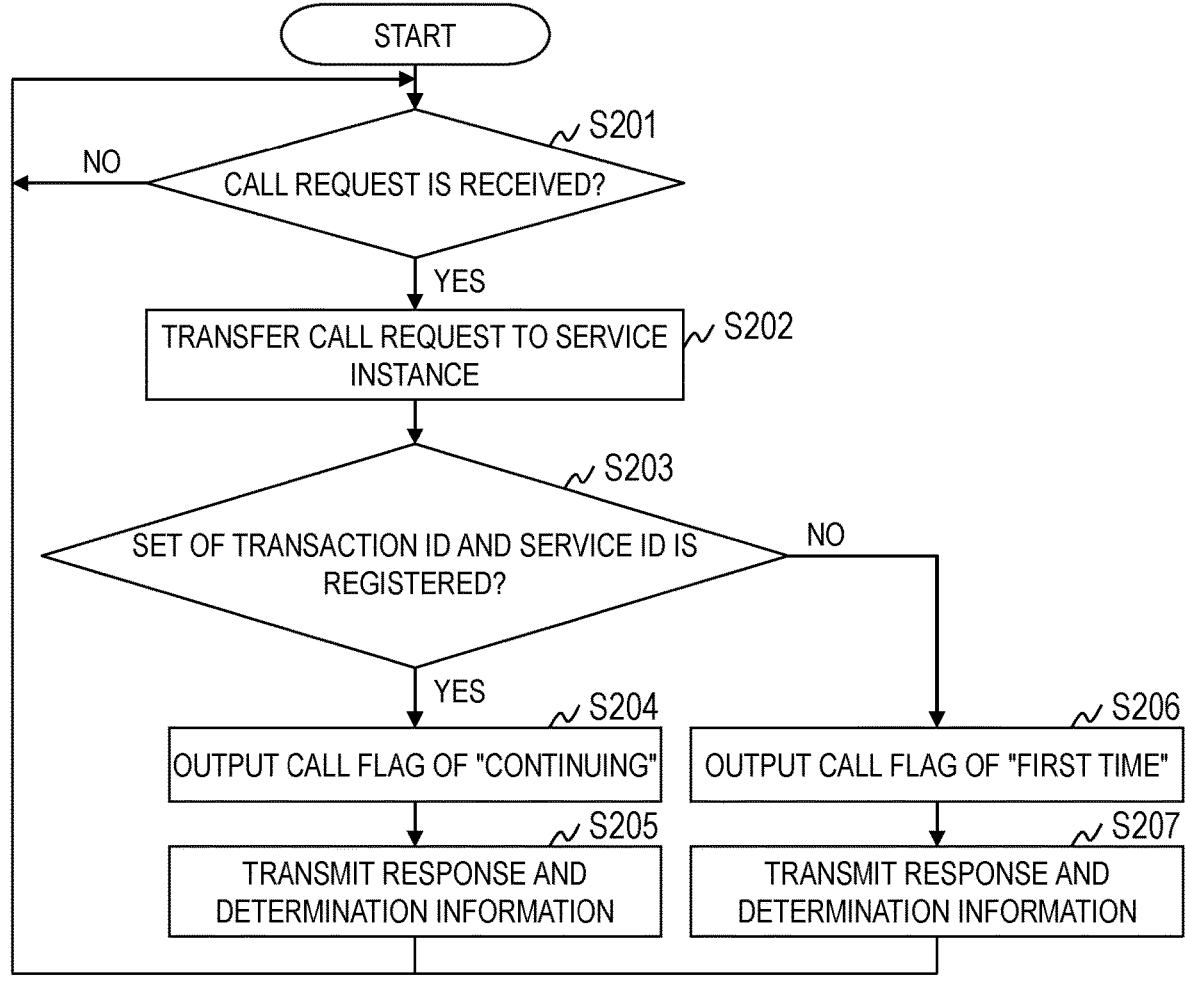
FIG. 4 is a table for showing an example of call state management information held by the service execution system in the first embodiment.
FIG. 5 is a flowchart for illustrating an example of processing executed by the service execution system in the first embodiment.

FIG. 4 is a table for showing an example of call state management information 400 held by the service execution system 100-1 in the first embodiment.

The call state management information 400 stores entries each including a transaction ID 401, a service ID 402, and a call flag 403. One entry corresponds to one piece of determination information.

The transaction ID 401 is a field for storing the identification information on the distributed transaction. The service ID 402 is a field for storing the identification information on the service executed by the service execution system 100 which has transmitted the determination information. The call flag 403 is a field for storing the call flag.

In a case where the transmission/reception module 111 receives the determination information, the transmission/reception module 111 transfers the determination information to the determination information storage module 114. The determination information storage module 114 registers an entry corresponding to the determination information in the call state management information 400.

The determination information storage module 114 initializes the call state management information 400 at the time of the start or the restart of the service execution system 100-1.

FIG. 5 is a flowchart for illustrating an example of the processing executed by the service execution system 100-2 in the first embodiment.

The transmission/reception module 111 of the service execution system 100-2 monitors the call request (S201).

In a case where the call request is received, the transmission/reception module 111 transfers the call request to the service instance 110 (S202). At this time, the transmission/reception module 111 transfers the identification information on the distributed transaction and the identification information on the service to the determination module 113.

The determination module 113 determines whether or not a set of the identification information on the distributed transaction and the identification information on the service is registered in the determination information storage module 114 (S203).

In a case where the set of the identification information on the distributed transaction and the identification information on the service is registered, the determination module 113 outputs the call flag of "continuing" to the transmission/reception module 111 (S204).

In a case where the transmission/reception module 111 receives processing completion from the service instance 110, the transmission/reception module 111 transmits the response and the determination information to the service execution system 100-1 (S205). The call flag of "continuing" is included in the determination information. After that, the transmission/reception module 111 continues the monitoring of the call request.

In a case where the set of the identification information on the distributed transaction and the identification information on the service is not registered, the determination module 113 outputs the call flag of "first time" to the transmission/reception module 111 (S206). At this time, the determination module 113 transmits, to the determination information storage module 114, the set of the identification information on the distributed transaction and the identification information on the service.

In a case where the transmission/reception module 111 receives the processing completion from the service instance 110, the transmission/reception module 111 transmits the response and the determination information to the service execution system 100-1 (S207). The call flag of "first time" is included in the determination information. After that, the transmission/reception module 111 continues the monitoring of the call request.

Figure 6:
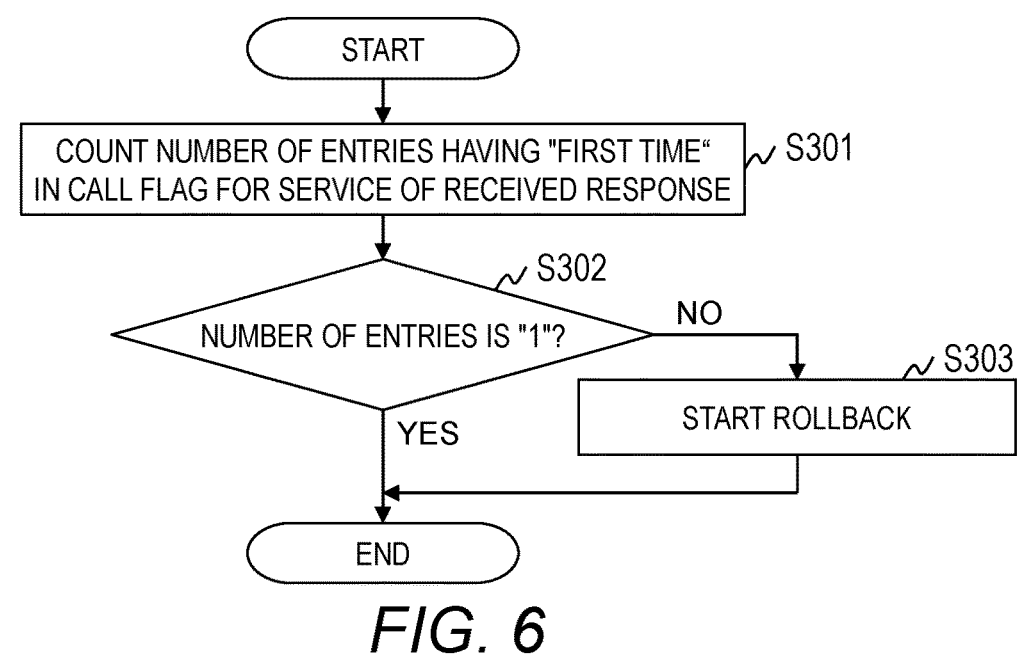
FIG. 6 is a flowchart for illustrating an example of determination processing executed by the service execution system in the first embodiment.

FIG. 6 is a flowchart for illustrating an example of the determination processing executed by the service execution system 100-1 in the first embodiment.

In a case where the transmission/reception module 111 receives the response, the transmission/reception module 111 instructs the determination module 113 to execute the determination processing. First, the determination module 113 refers to the call state management information 400, and counts the number of entries each matching the identification information on the distributed transaction and the identification information on the service included in the determination information and having "first time" in the call flag 403 (S301).

The determination module 113 determines whether or not the number of entries is "1" (S302).

In a case where the number of entries is "1," the determination module 113 finishes the determination processing. In a case where the number of entries is larger than "1," the determination module 113 determines that the rollback of the distributed transaction is required, and hence starts the rollback (S303). After that, the determination module 113 finishes the determination processing. The rollback of the distributed transaction may be executed by the determination module 113 or may be executed by the transaction control module 112.

According to the first embodiment, it is possible to detect the inconsistency of the data caused by the restart of the service in the application which executes the distributed transaction. Even when the information on the service which has restarted is lost, the inconsistency of the data can be detected.

Second Embodiment

In a second embodiment of this invention, the data included in the determination information and the content of the determination processing are different from those in the first embodiment. Description is now given of the second embodiment while focusing on the difference from the first embodiment.

The configuration of a system according to the second embodiment is the same as that in the first embodiment. In the second embodiment, the data included in the determination information is different.

Figure 7:
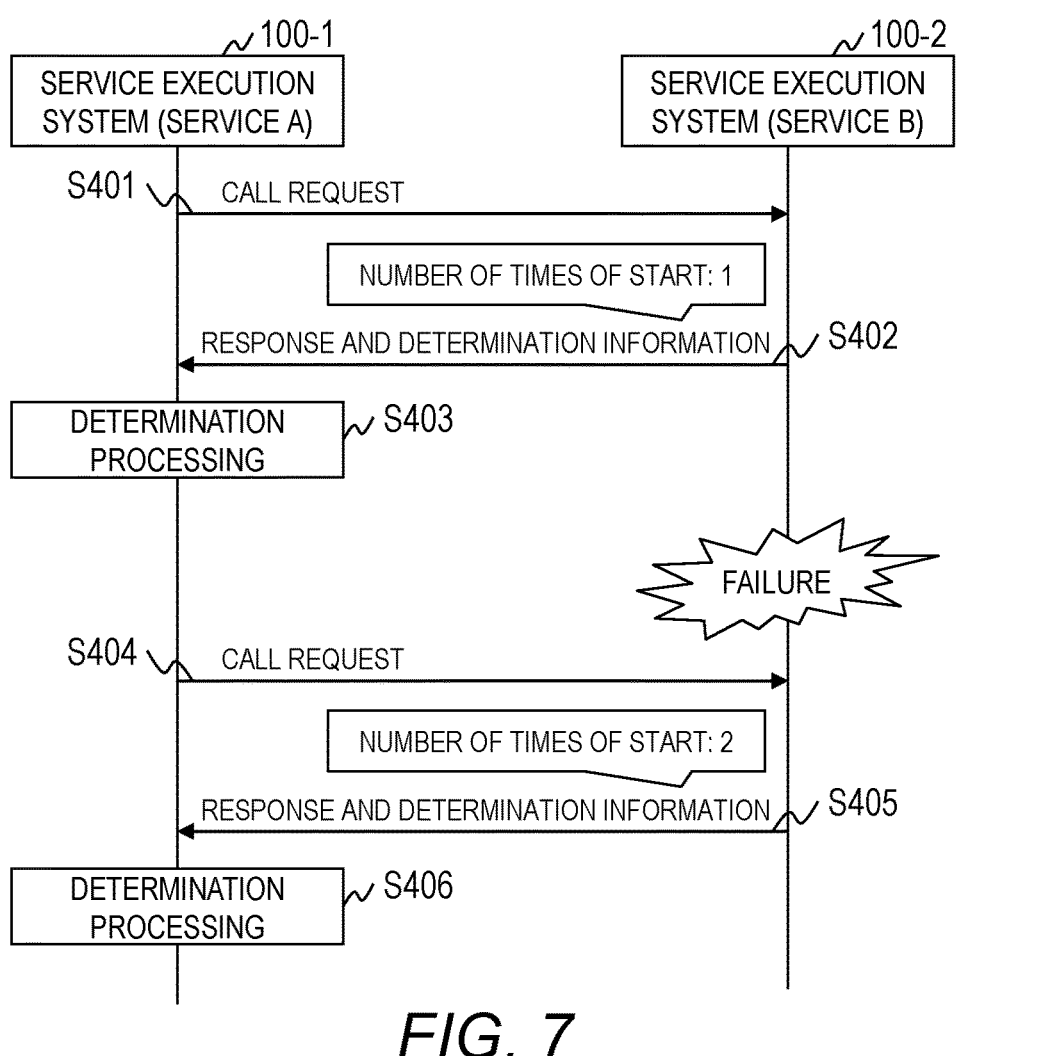
FIG. 7 is a sequence diagram for illustrating a flow of processing of the distributed transaction in the system according to a second embodiment.

FIG. 7 is a sequence diagram for illustrating a flow of processing of the distributed transaction in the system according to the second embodiment.

The service execution system 100-1 transmits a call request to the service execution system 100-2 as a result of the start of the distributed transaction (S401). The call request includes identification information on the distributed transaction and identification information on the service (service A).

The service execution system 100-2 transmits a response and determination information to the service execution system 100-1 after the execution of the service (S402).

In the second embodiment, the number of times of the start of the service, the identification information on the service, identification information on the service instance 110 which has executed the service, and the identification information on the distributed transaction are transmitted as the determination information.

In a case where the service execution system 100-1 receives the response and the determination information, the service execution system 100-1 executes determination processing for determining whether or not rollback of the distribution transaction is required (S403). Details of the determination processing are described later. It is determined here that the rollback is not required.

The service execution system 100-2 receives the call request in the same distributed transaction from the service execution system 100-1 after an occurrence of a failure and a restart (S404). In this case, the service execution system 100-2 transmits the response and the determination information to the service execution system 100-1 after the execution of the service (S405). The number of times of the start is a value obtained by adding 1 to the value obtained the previous time.

In a case where the service execution system 100-1 receives the response and the determination information, the service execution system 100-1 executes the determination processing (S406). It is determined here that the rollback is required.

In a case of a distributed transaction in which three or more services are called, the determination information transmitted by each service execution system 100 is transferred to a service execution system 100 being a start point. Specifically, the determination information storage module 114 of each service execution system 100 records the determination information received from another service execution system 100, and the transmission/reception module 111 transmits, after the execution of the service, the determination information on this service execution system 100 and the determination information recorded by the determination information storage module 114. After that, the service execution system 100 being the start point executes the determination processing for each service execution system 100.

Figures 8, 9:
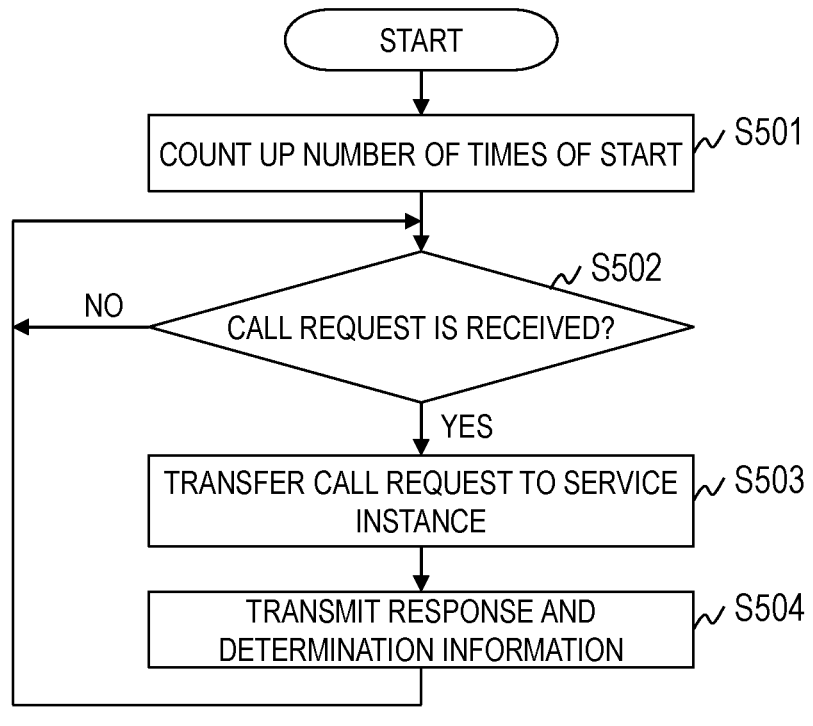
FIG. 8 is a table for showing an example of the call state management information held by the service execution system in the second embodiment.
FIG. 9 is a flowchart for illustrating an example of the processing executed by the service execution system in the second embodiment.

FIG. 8 is a table for showing an example of call state management information 800 held by the service execution system 100-1 in the second embodiment.

The call state management information 800 stores entries each including a transaction ID 801, a service ID 802, an instance ID 803, and the number of times of start 804. One entry corresponds to one piece of determination information.

The transaction ID 801 and the service ID 802 are the same fields as the transaction ID 401 and the service ID 402.

The instance ID 803 is a field for storing the identification information on the service instance 110. The number of times of start 804 is a field for storing the number of times of the start of the service.

In a case where the transmission/reception module 111 receives the determination information, the transmission/reception module 111 transfers the determination information to the determination information storage module 114. The determination information storage module 114 registers an entry corresponding to the determination information in the call state management information 800.

The determination information storage module 114 initializes the call state management information 800 at the time of the start or the restart of the service execution system 100-1.

FIG. 9 is a flowchart for illustrating an example of the processing executed by the service execution system 100-2 in the second embodiment.

The transaction control module 112 of the service execution system 100-2 counts up the number of times of the start and records the number of times of the start in a nonvolatile storage device (S501).

The transmission/reception module 111 of the service execution system 100-2 monitors the call request (S502).

In a case where the call request is received, the transmission/reception module 111 transfers the call request to the service instance 110 (S503).

In a case where the transmission/reception module 111 receives the processing completion from the service instance 110, the transmission/reception module 111 transmits the response and the determination information to the service execution system 100-1 (S504). The number of times of the start of the service, the identification information on the service, the identification information on the service instance 110 which has executed the service, and the identification information on the distributed transaction are included in the determination information. After that, the transmission/reception module 111 continues the monitoring of the call request.

Figure 10:
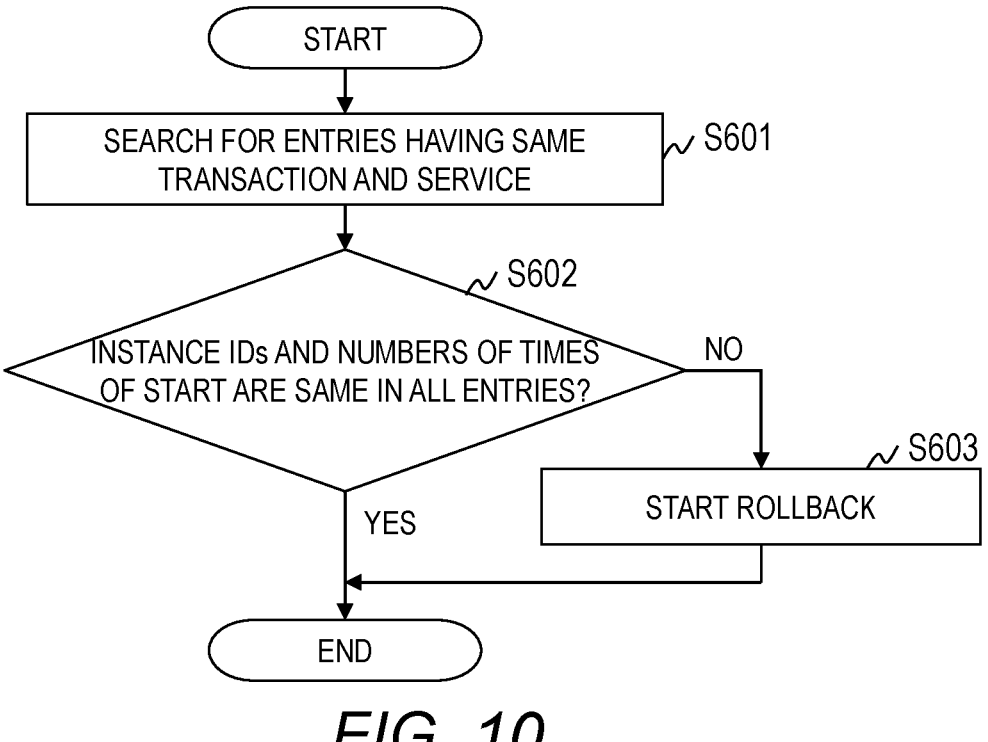
FIG. 10 is a flowchart for illustrating an example of the determination processing executed by the service execution system in the second embodiment.

FIG. 10 is a flowchart for illustrating an example of the determination processing executed by the service execution system 100-1 in the second embodiment.

In a case where the transmission/reception module 111 receives the response, the transmission/reception module 111 instructs the determination module 113 to execute the determination processing. First, the determination module 113 refers to the call state management information 800 and searches for entries each having the matching identification information on the distributed transaction and the matching identification information on the service included in the determination information (S601).

The determination module 113 determines whether or not all of the entries have the same set of the number of times of the start and the service instance 110 (S602).

In a case where all of the entries have the same set of the number of times of the start and the service instance 110, the determination module 113 finishes the determination processing.

In a case where at least one entry has a different set of the number of times of the start and the service instance 110, the determination module 113 determines that the rollback of the distributed transaction is required, and hence starts the rollback (S603). After that, the determination module 113 finishes the determination processing. The rollback of the distributed transaction may be executed by the determination module 113 or may be executed by the transaction control module 112.

According to the second embodiment, it is possible to detect the data inconsistency caused by any one the restart of the service or the call of a different service instance 110 in the distributed transaction.

The identification information on the service instance 110 may not be included in the determination information. In this case, the data inconsistency caused by the restart of the service can be detected.

Third Embodiment

In a third embodiment of this invention, the service execution system 100-2 which has received the call request executes the determination processing. Description is now given of the third embodiment while focusing on the difference from the first embodiment.

Figure 11:
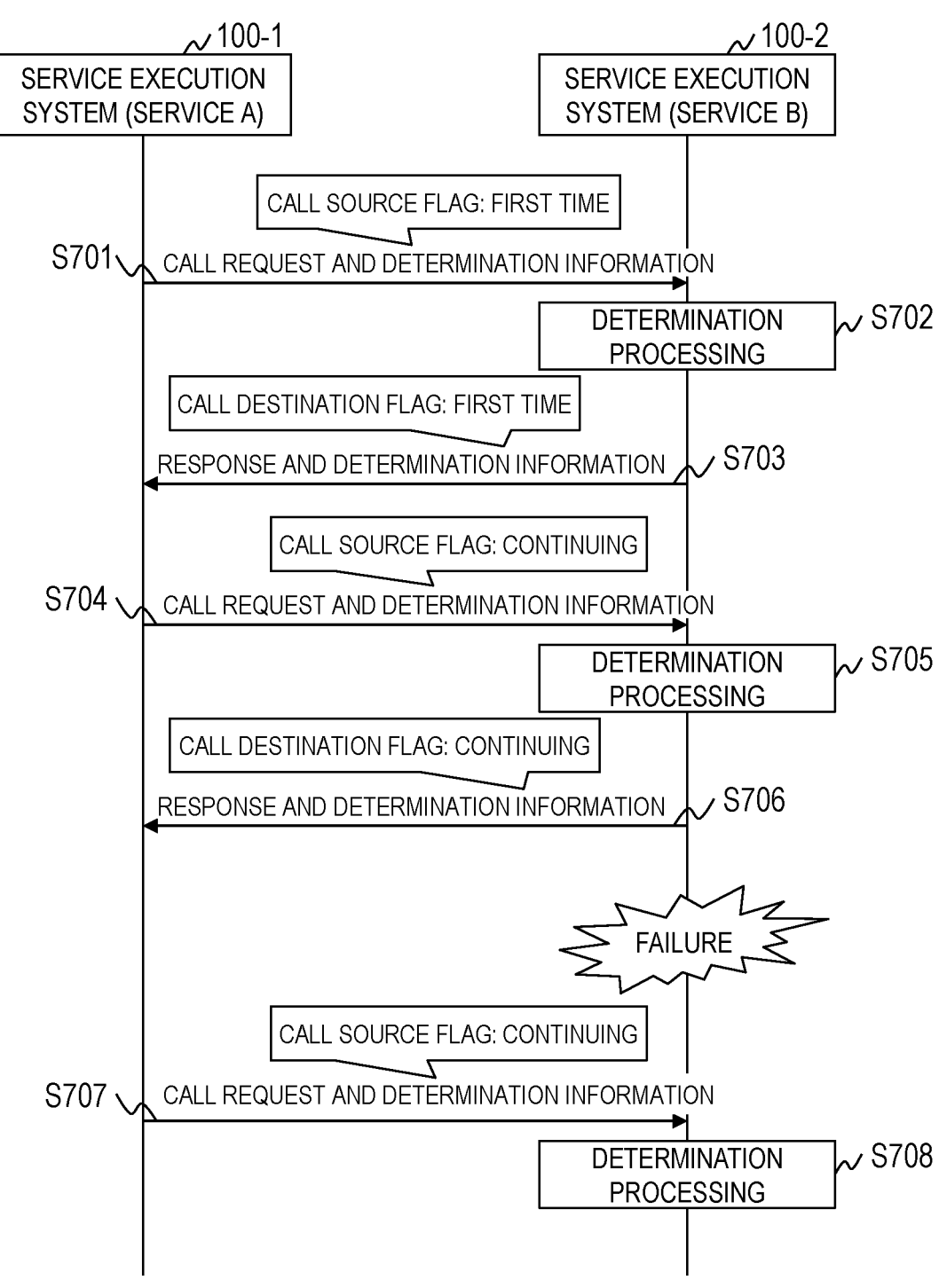
FIG. 11 is a sequence diagram for illustrating the flow of the processing of the distributed transaction in the system according to a third embodiment.

The configuration of a system according to the third embodiment is the same as that in the first embodiment. FIG. 11 is a sequence diagram for illustrating the flow of the processing of the distributed transaction in the system according to the third embodiment.

The service execution system 100-1 transmits a call request and determination information to the service execution system 100-2 as a result of the start of the distributed transaction (S701). The call request includes identification information on the distributed transaction and identification information on the service (service A). The determination information includes the call flag indicating the call state of the service. In a case where the call request is transmitted for the first time, the call flag of "first time" is transmitted. In a case where the call request is transmitted for a second or subsequent time, the call flag of "continuing" is transmitted.

In a case where the service execution system 100-2 receives the call request and the determination information, the service execution system 100-2 executes determination processing for determining whether or not rollback of the distribution transaction is required (S702). Details of the determination processing are described later. It is determined here that the rollback is not required.

The service execution system 100-2 transmits the response and the determination information to the service execution system 100-1 after the execution of the service (S703).

In the third embodiment, the call flag, the identification information on the service, and the identification information on the distributed transaction are transmitted as the determination information.

In a case where the service execution system 100-1 receives the response and the determination information, the service execution system 100-1 records the call flag.

The service execution system 100-1 transmits the call request and the determination information to the service execution system 100-2 in the same distributed transaction (S704). The service execution system 100-1 has received the call flag of "first time" from the service execution system 100-2, and hence transmits the call flag of "continuing."

In a case where the service execution system 100-2 receives the call request and the determination information, the service execution system 100-2 executes the determination processing (S705). It is determined here that the rollback is not required.

The service execution system 100-2 transmits the response and the determination information to the service execution system 100-1 after the execution of the service (S706).

The service execution system 100-2 receives the call request and the determination information in the same distributed transaction from the service execution system 100-1 after an occurrence of a failure and a restart (S707). In this case, the service execution system 100-1 has received the call flag of "first time" from the service execution system 100-2, and hence transmits the call flag of "continuing."

The service execution system 100-2 executes the determination processing (S708). It is determined here that the rollback is required.

In the case of a distributed transaction in which three or more services are called, each service execution system 100 which receives the call request executes the determination processing.

Figure 12:
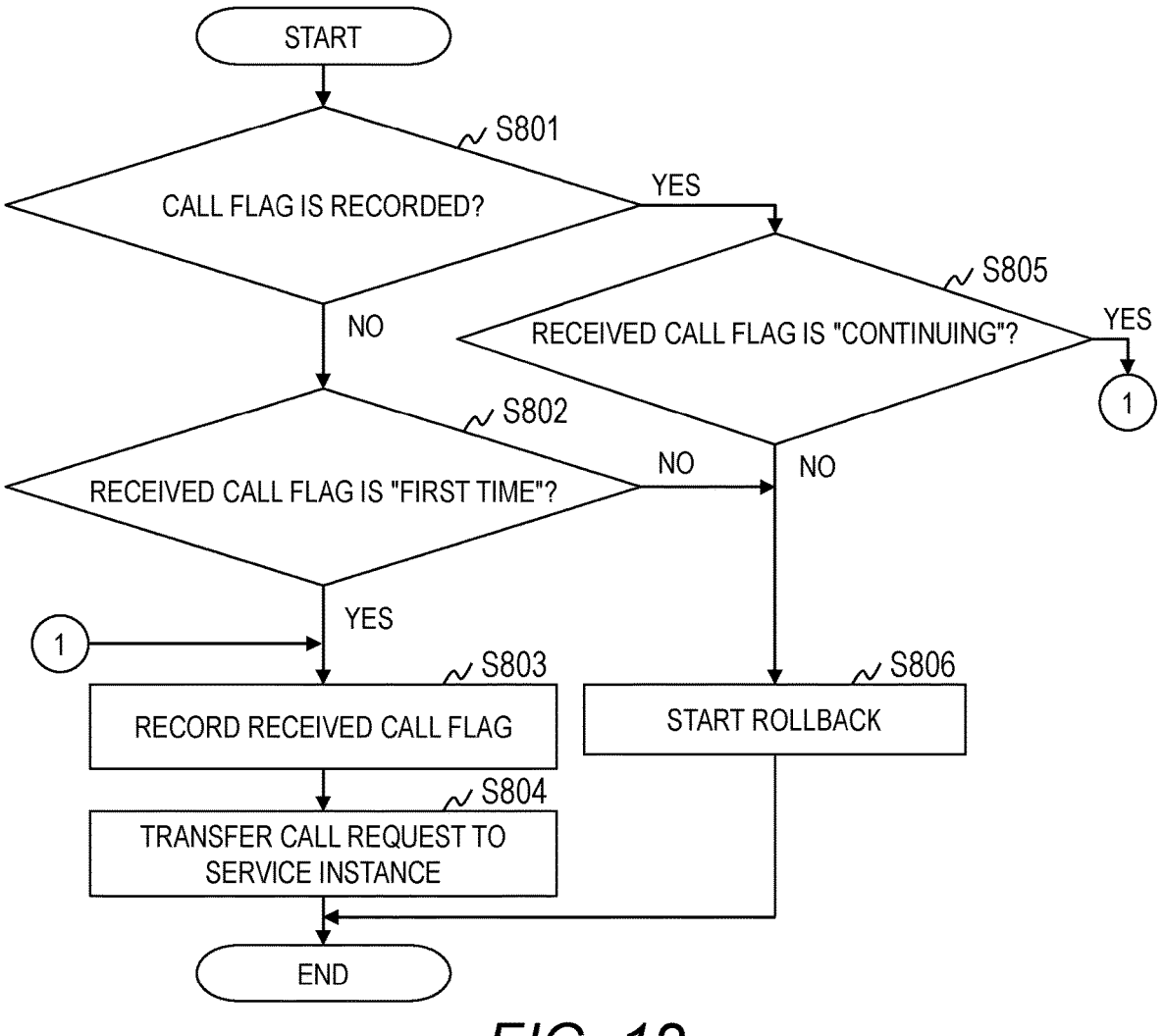
FIG. 12 is a flowchart for illustrating an example of the determination processing executed by the service execution system in the third embodiment.

FIG. 12 is a flowchart for illustrating an example of the determination processing executed by the service execution system 100-2 in the third embodiment.

In a case where the transmission/reception module 111 receives the call request, the transmission/reception module 111 instructs the determination module 113 to execute the determination processing. First, the determination module 113 inquires of the determination information storage module 114 whether or not the call flag is recorded (S801).

In a case where the call flag is not recorded, the determination module 113 determines whether or not the received call flag is "first time" (S802).

In a case where the received call flag is not "first time," the determination module 113 determines that the rollback of the distributed transaction is required, and hence starts the rollback (S806). After that, the determination module 113 finishes the determination processing. The rollback of the distributed transaction may be executed by the determination module 113 or may be executed by the transaction control module 112.

In a case where the received call flag is "first time," the determination module 113 records the received call flag (S803). Specifically, the determination module 113 transfers the received call flag to the determination information storage module 114. The determination module 113 transfers the call request to the service instance 110 (S804), and then finishes the determination processing.

In a case where the call flag is recorded, the determination module 113 determines whether or not the received call flag is "continuing" (S805).

In a case where the received call flag is "continuing," the determination module 113 records the received call flag (S803). The determination module 113 transfers the call request to the service instance 110 (S804), and then finishes the determination processing.

In a case where the received call flag is not "continuing," the determination module 113 determines that the rollback of the distributed transaction is required, and hence starts the rollback (S806). After that, the determination module 113 finishes the determination processing.

According to the third embodiment, it is possible to detect the inconsistency of the data in the distributed transaction caused by the restart of the service in units of the service.

Fourth Embodiment

In a fourth embodiment of this invention, the service execution system 100-2 which has received the call request executes the determination processing. Description is now given of the fourth embodiment while focusing on the difference from the first embodiment.

Figure 13:
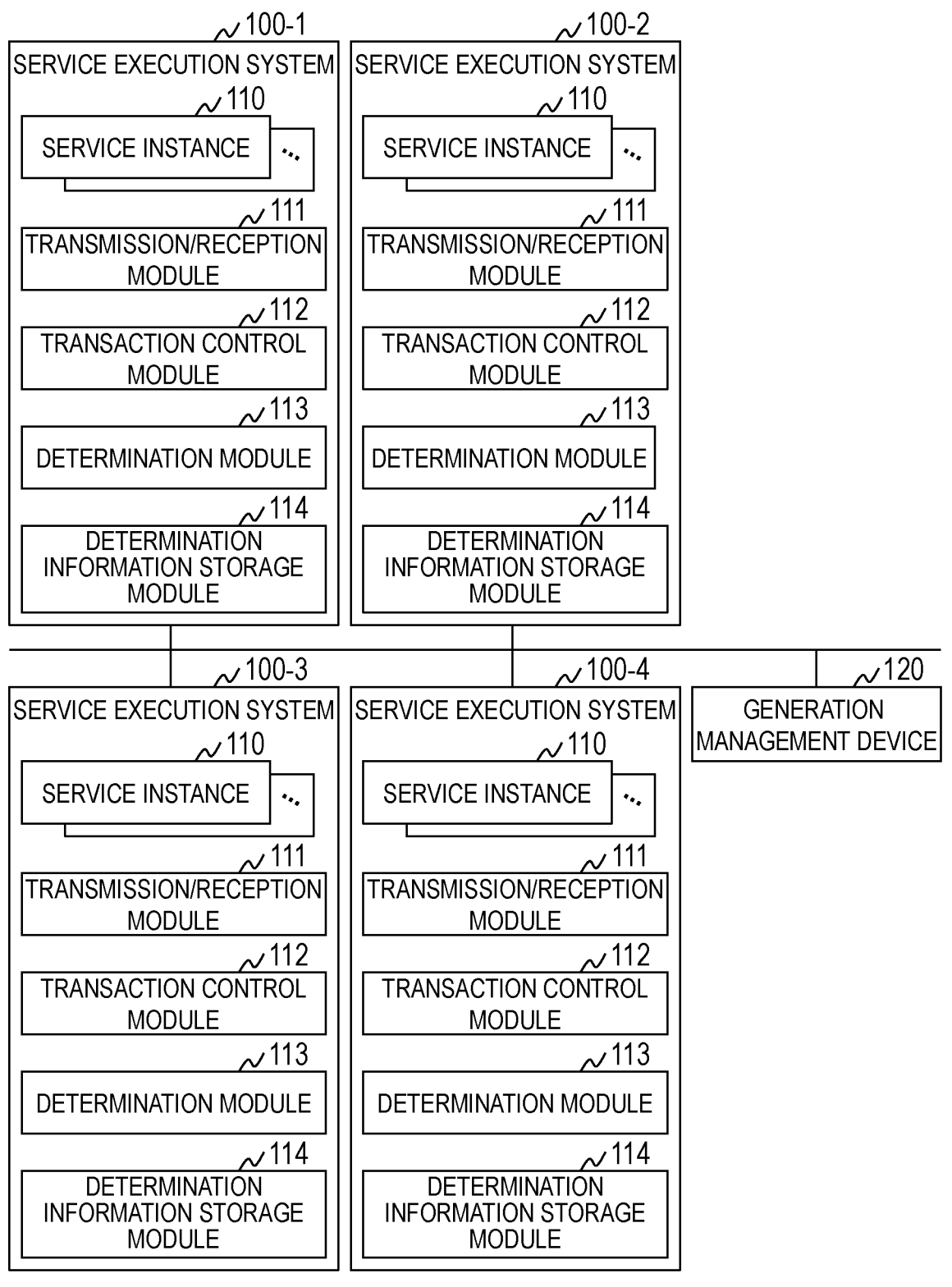
FIG. 13 is a diagram for illustrating an example of the configuration of the system according to a fourth embodiment.

FIG. 13 is a diagram for illustrating an example of the configuration of a system according to the fourth embodiment. The system according to the fourth embodiment includes a generation management device 120. Any one of the service execution systems 100 may have a function of the generation management device 120.

In the fourth embodiment, the generation management device 120 assigns a generation of each of the distributed transaction and the service instance 110.

Figure 14:
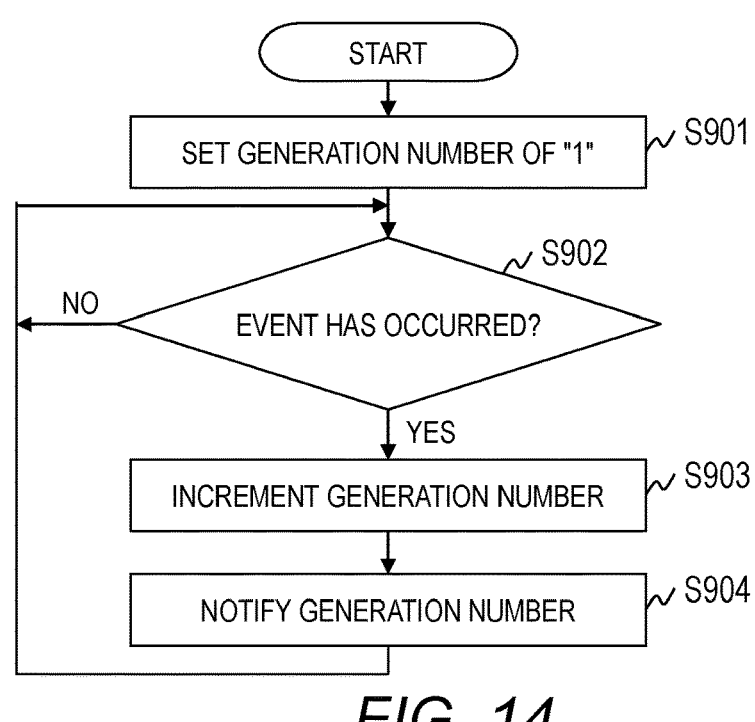
FIG. 14 is a flowchart for illustrating an example of processing executed by a generation management device in the fourth embodiment.

FIG. 14 is a flowchart for illustrating an example of processing executed by the generation management device 120 in the fourth embodiment.

After starting up, the generation management device 120 sets an initial value "1" as a generation number (S901), and monitors an occurrence of an event (S902). For example, the generation management device 120 detects, as the occurrence of the event, the start of the distributed transaction, the start of the service, or the like.

In a case where the event has occurred, the generation management device 120 increments the generation number by 1 (S903), and notifies a source of occurrence of the event of the generation number (S904). After that, the generation management device 120 monitors the occurrence of the event.

Figure 15:
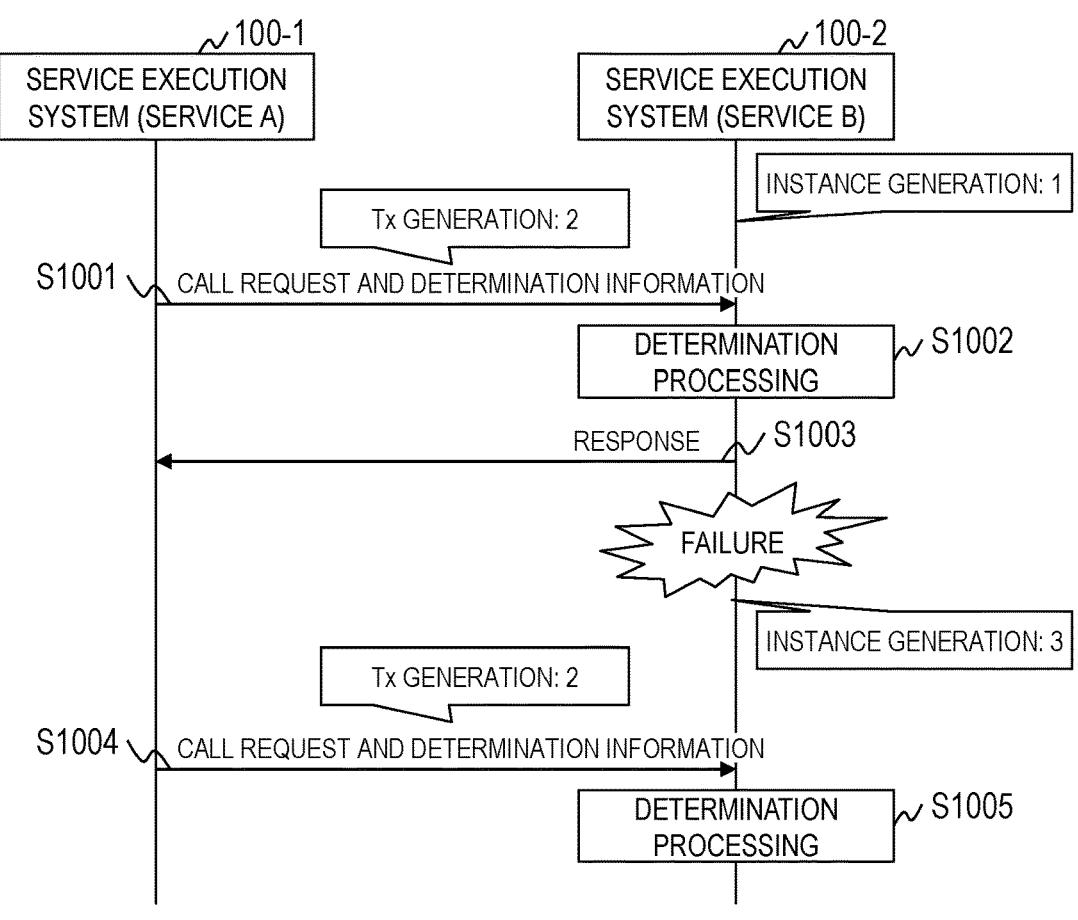
FIG. 15 is a sequence diagram for illustrating the flow of the processing of the distributed transaction in the system according to the fourth embodiment.

FIG. 15 is a sequence diagram for illustrating a flow of processing of the distributed transaction in the system according to the fourth embodiment.

The service execution system 100-2 obtains a generation number of "1" from the generation management device 120 at the time of the start and manages this generation number as an instance generation.

The service execution system 100-1 transmits a call request and determination information to the service execution system 100-2 as a result of the start of the distributed transaction (S1001). The call request includes identification information on the service (service A). The determination information includes the generation of the transaction. Specifically, the service execution system 100-1 obtains a generation number of "2" from the generation management device 120, and transmits this generation number as the transaction generation.

In a case where the service execution system 100-2 receives the call request and the determination information, the service execution system 100-2 executes determination processing for determining whether or not rollback of the distribution transaction is required (S1002). Details of the determination processing are described later. It is determined here that the rollback is not required.

The service execution system 100-2 transmits the response to the service execution system 100-1 after the execution of the service (S1003).

The service execution system 100-2 receives the call request and the determination information in the same distributed transaction from the service execution system 100-1 after an occurrence of a failure and a restart (S1004).

The service execution system 100-2 obtains a generation number of "3" from the generation management device 120 as a result of the restart of the service and manages this generation number as an instance generation. Moreover, the call request is in the same distributed transaction, and hence the service execution system 100-1 transmits the same transaction generation as that at the previous time.

The service execution system 100-2 executes the determination processing (S1005). It is determined here that the rollback is required.

In the case of a distributed transaction in which three or more services are called, each service execution system 100 which receives the call request executes the determination processing.

Figure 16:
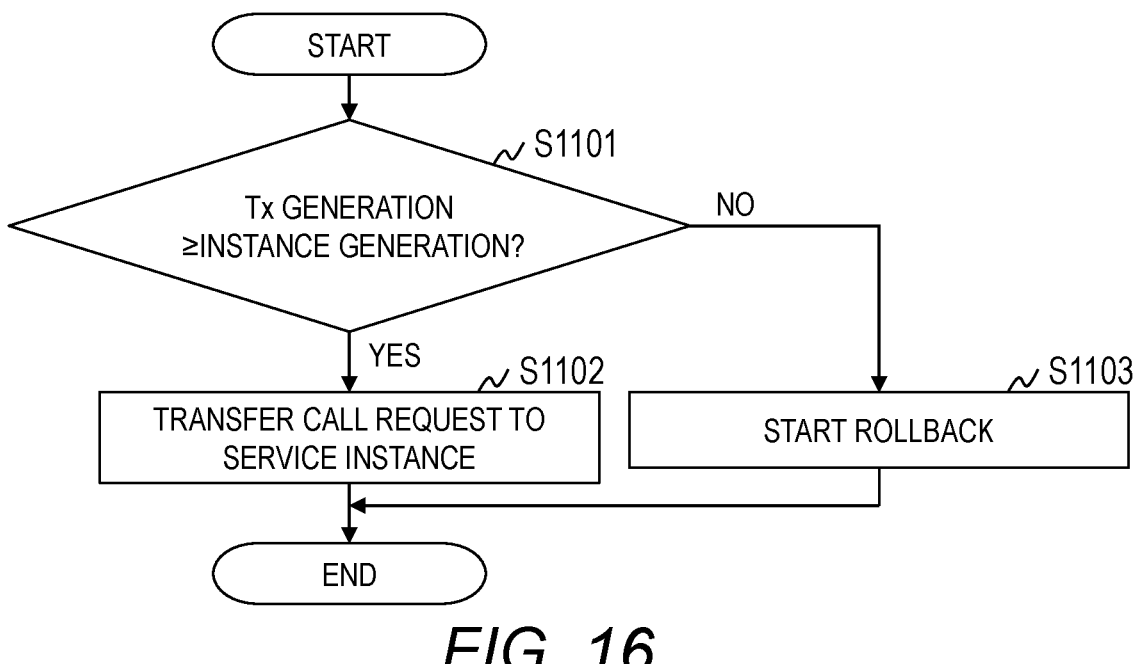
FIG. 16 is a flowchart for illustrating an example of the determination processing executed by the service execution system in the fourth embodiment.

FIG. 16 is a flowchart for illustrating an example of the determination processing executed by the service execution system 100-2 in the fourth embodiment.

In a case where the transmission/reception module 111 receives the response, the transmission/reception module 111 instructs the determination module 113 to execute the determination processing. First, the determination module 113 determines whether or not the transaction generation is equal to or larger than the instance generation (S1101).

In a case where the transaction generation is equal to or larger than the instance generation, the determination module 113 transfers the call request to the service instance 110 (S1102), and then finishes the determination processing.

In a case where the transaction generation is smaller than the instance generation, the determination module 113 determines that the rollback of the distributed transaction is required, and hence starts the rollback (S1103). After that, the determination module 113 finishes the determination processing. The rollback of the distributed transaction may be executed by the determination module 113 or may be executed by the transaction control module 112.

According to the fourth embodiment, it is possible to detect the inconsistency of the data in the distributed transaction caused by the restart of the service in units of the service.

Fifth Embodiment

The number of service instances 110 of the service execution system 100 changes in accordance with a load on the service. In a case where the number of service instances 110 is changed during the execution of the distributed transaction, the same service instance 110 may not be called. A system according to a fifth embodiment of this invention determines whether or not the rollback is required, and also calls the same service instance 110.

Figure 17:
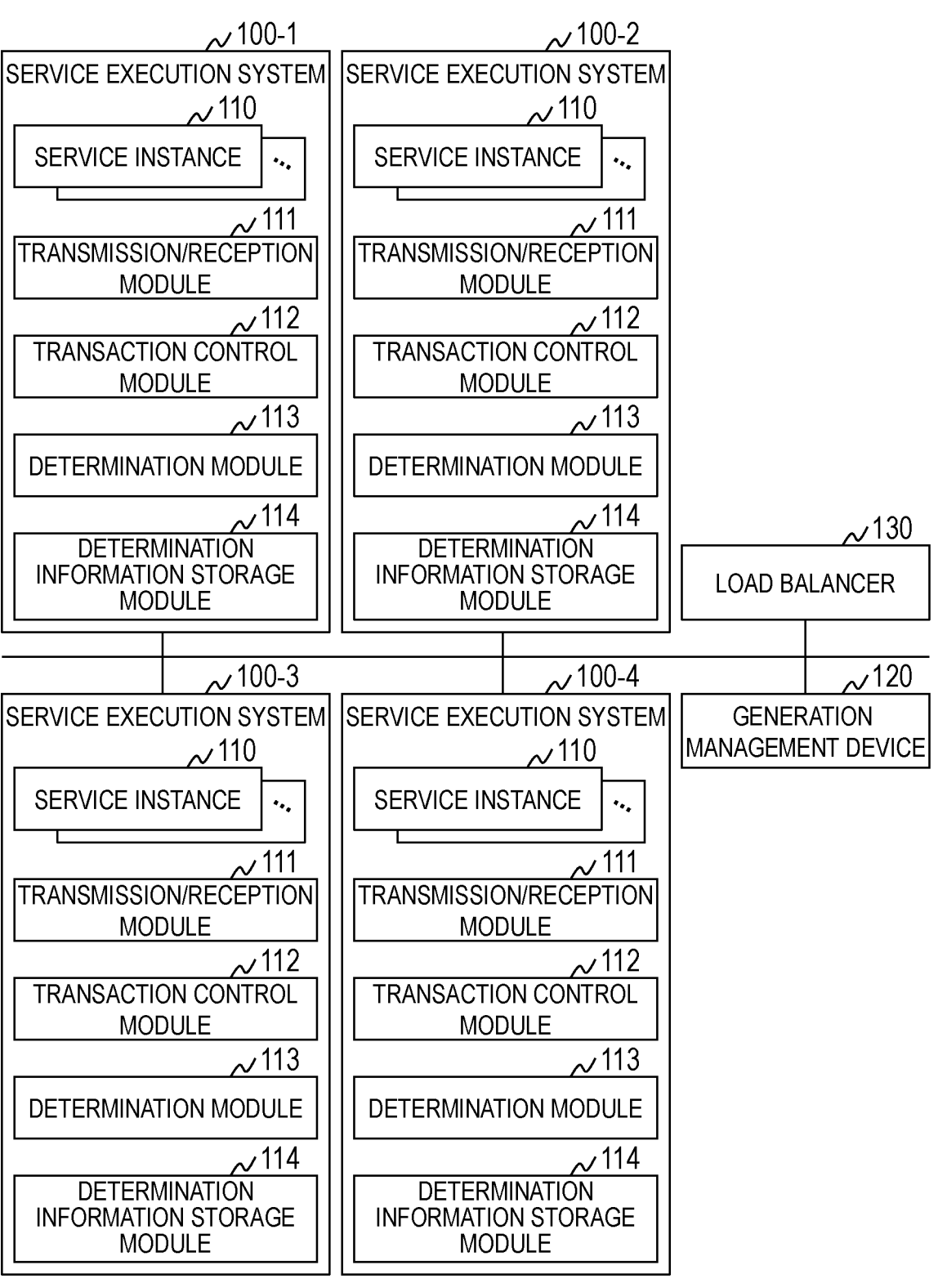
FIG. 17 is a diagram for illustrating an example of the configuration of the system according to a fifth embodiment.

FIG. 17 is a diagram for illustrating an example of the configuration of the system according to the fifth embodiment. The system according to the fifth embodiment includes the generation management device 120 and a load balancer 130.

Any one of the service execution systems 100 may have the function of the generation management device 120. Any one of the service execution systems 100 may have a function of the load balancer 130.

The generation management device 120 in the fifth embodiment has the same function as that of the generation management device 120 in the fourth embodiment. The load balancer 130 uses path information to control the call of the service instance 110 of each service. The load balancer 130 in the fifth embodiment holds path management information 1900. Details of the path management information 1900 are described later.

Figure 18A:
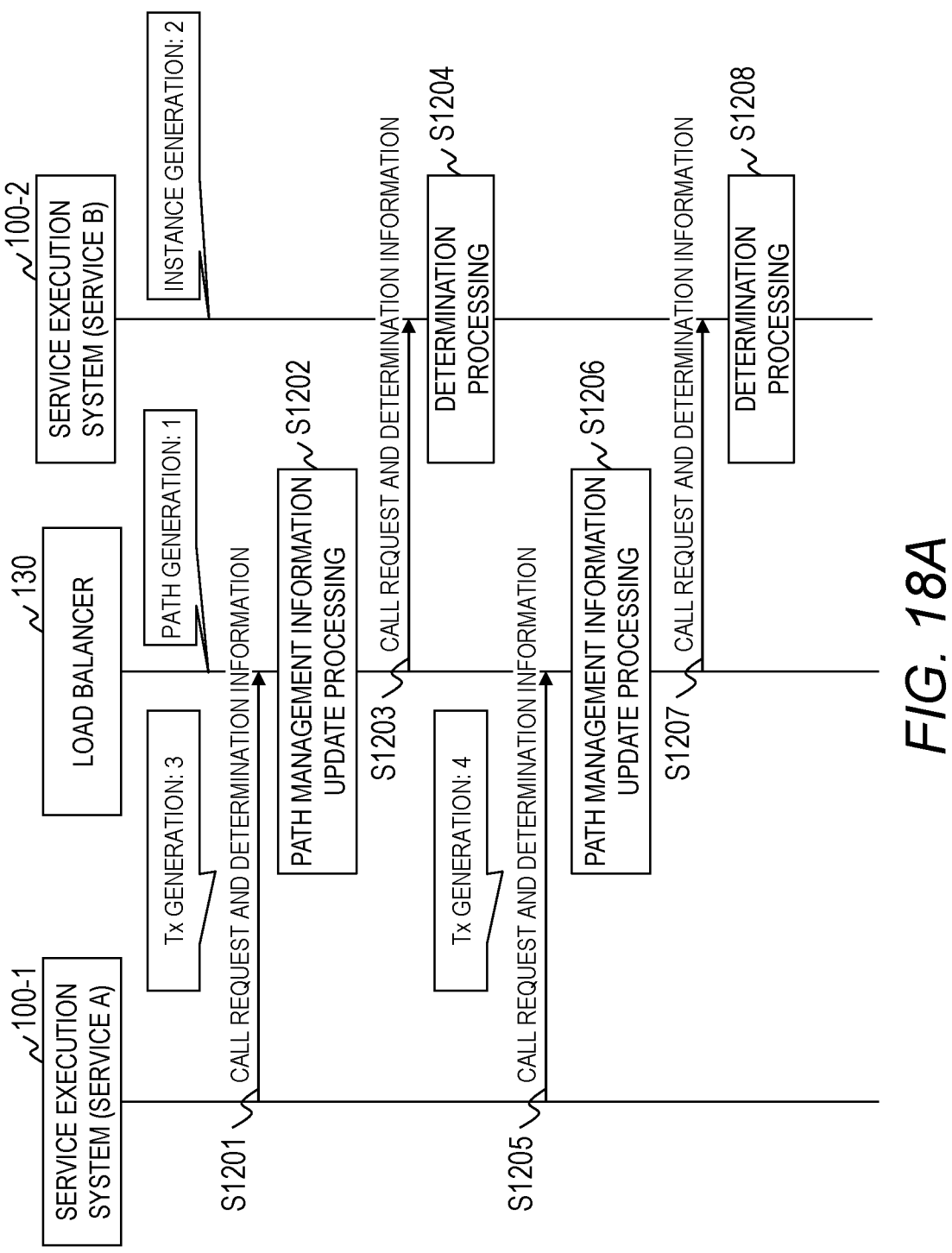
FIG. 18A and FIG. 18B are sequence diagrams for illustrating the flow of the processing of the distributed transaction in the system according to the fifth embodiment.
Figure 18B:
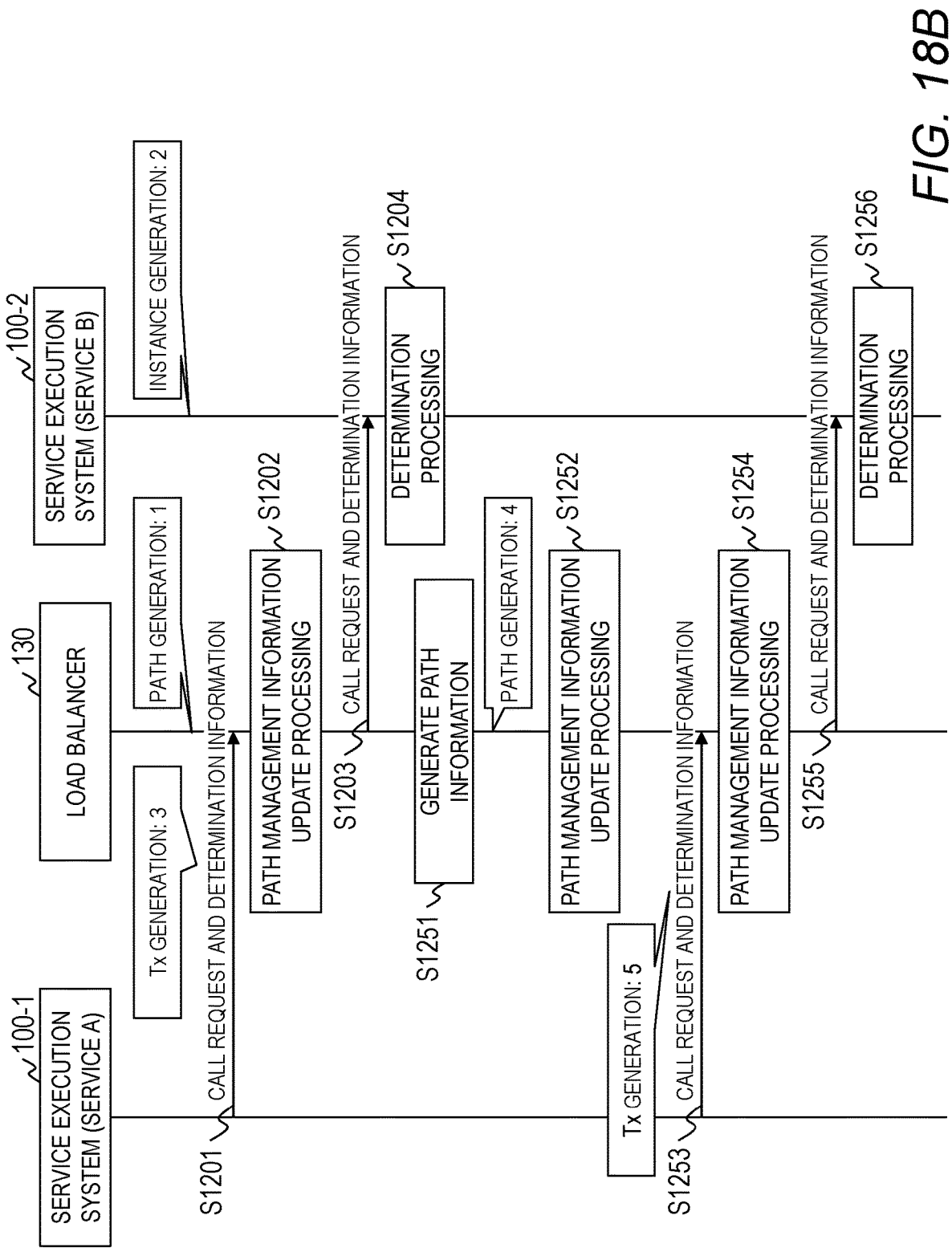

FIG. 18A and FIG. 18B are sequence diagrams for illustrating the flow of the processing of the distributed transaction in the system according to the fifth embodiment. FIG. 19A, FIG. 19B, FIG. 19C, and FIG. 19D are tables for showing an example of the path management information 1900 in the fifth embodiment.

First, the sequence diagram of FIG. 18A is described. The load balancer 130 obtains a generation number of "1" from the generation management device 120 at the time of generating of path information, and manages this generation number as a path generation. At this time, the load balancer 130 generates the path management information 1900 including an entry having the generation number of "1" stored in a path generation 1901 and the path information stored in path information 1903. The service execution system 100-2 obtains a generation number of "2" from the generation management device 120 at the time of the start and manages this generation number as the instance generation.

The service execution system 100-1 transmits a call request and determination information to the service execution system 100-2 as a result of the start of the distributed transaction (S1201). The call request includes identification information on the service (service A). The determination information includes the generation of the transaction. Specifically, the service execution system 100-1 obtains a generation number of "3" from the generation management device 120, and transmits this generation number as the transaction generation.

In a case where the load balancer 130 receives the call request and the determination information, the load balancer 130 executes path management information update processing (S1202). The path management information 1900 as shown in FIG. 19A is generated here. The path management information 1900 stores an entry including the path generation 1901, a transaction generation 1902, and the path information 1903.

The load balancer 130 transmits the call request and the determination information to the service execution system 100-2 based on the path information associated with the path generation of "1" (S1203).

In a case where the service execution system 100-2 receives the call request and the determination information, the service execution system 100-2 executes the determination processing (S1204). The determination processing in the fifth embodiment is the same as the determination processing in the fourth embodiment, and hence description thereof is omitted.

The service execution system 100-1 transmits the call request and the determination information to the service execution system 100-2 as a result of the start of a new distributed transaction (S1205). The service execution system 100-1 obtains a generation number of "4" from the generation management device 120 and transmits this generation number as the transaction generation.

In a case where the load balancer 130 receives the call request and the determination information, the load balancer 130 executes path management information update processing (S1206). The path management information 1900 is updated here as shown in FIG. 19B.

Processing steps of Step S1207 and Step S1208 are the same as the processing steps of Step S1203 and Step S1204, respectively.

The sequence diagram of FIG. 18B is now described. The load balancer 130 obtains a generation number of "1" from the generation management device 120 at the time of the generating of path information, and manages this generation number as the path generation. At this time, the load balancer 130 generates the path management information 1900 including an entry having the generation number of "1 stored" in the path generation 1901 and the path information stored in the path information 1903. The service execution system 100-2 obtains a generation number of "2" from the generation management device 120 at the time of the start and manages this generation number as the instance generation.

Processing steps of from Step S1201 to Step S1204 are the same as the corresponding processing steps described with reference to FIG. 18A.

As a result of an increase or a decrease in the number of service instances 110 of the service execution system 100-2, the load balancer 130 generates new path information (S1251), and further executes the path management information update processing (S1252). The load balancer 130 obtains a generation number of "4" from the generation management device 120 at the time of the generating of the path information, and manages this generation number as the path generation. Moreover, the path management information 1900 is updated by the path management information update processing as shown in FIG. 19C.

The service execution system 100-1 transmits the call request and the determination information to the service execution system 100-2 as a result of the start of a new distributed transaction (S1253). The service execution system 100-1 obtains a generation number of "5" from the generation management device 120 and transmits this generation number as the transaction generation.

In a case where the load balancer 130 receives the call request and the determination information, the load balancer 130 executes the path management information update processing (S1254). The path management information 1900 is updated here as shown in FIG. 19D.

In a case where the load balancer 130 receives the call request, the load balancer 130 switches the path information to be used in accordance with the transaction generation included in the call request, and transfers the call request to a predetermined service instance 110. As a result, even when the number of service instances 110 changes, the call of the same service instance 110 can be achieved.

Figure 20:
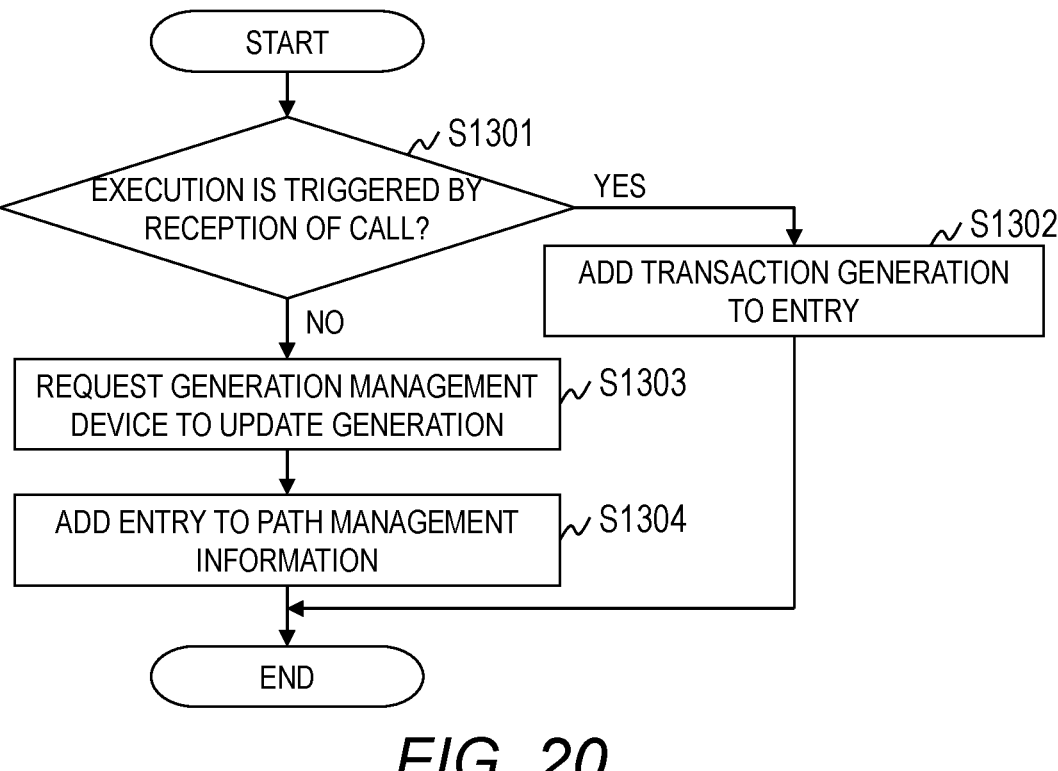
FIG. 20 is a flowchart for illustrating an example of path management information update processing executed by a load balancer in the fifth embodiment.

FIG. 20 is a flowchart for illustrating an example of the path management information update processing executed by the load balancer 130 in the fifth embodiment.

The load balancer 130 determines whether or not the execution is triggered by the reception of the call request (S1301).

In a case where the execution is triggered by the reception of the call request, the load balancer 130 registers the transaction generation included in the call request in an entry corresponding to the current path generation of the path management information 1900 (S1302). After that, the load balancer 130 finishes the path management information update processing.

In a case where the execution is not triggered by the reception of the call request, the load balancer 130 requests the generation management device 120 to update the generation (S1303).

The load balancer 130 adds an entry to the path management information 1900 (S1304), and finishes the path management information update processing. In the path generation 1901 of the added entry, the generation number obtained from the generation management device 120 is stored. Moreover, in the path information 1903 of the added entry, newly generated path information is stored.

According to the fifth embodiment, as with the fourth embodiment, it is possible to detect inconsistency of the data in the distributed transaction caused by the restart of the service in units of the service. Moreover, even when the number of service instances 110 increases or decreases, it is possible to perform control such that the same service instance 110 executes the processing in the distributed transaction.

Sixth Embodiment

Figure 21A:
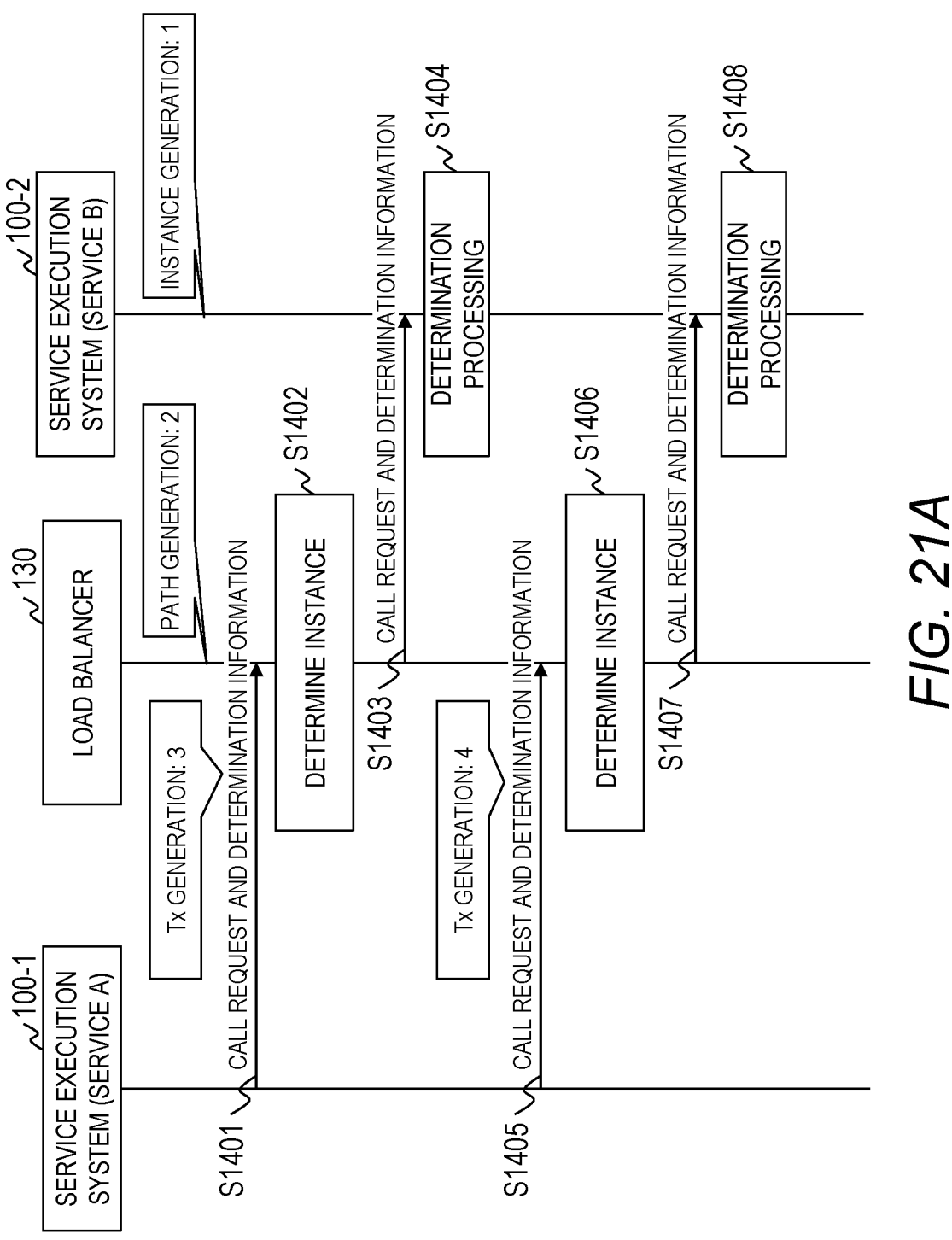
FIG. 21A and FIG. 21B are sequence diagrams for illustrating the flow of the processing of the distributed transaction in the system according to a sixth embodiment.
Figure 21B:
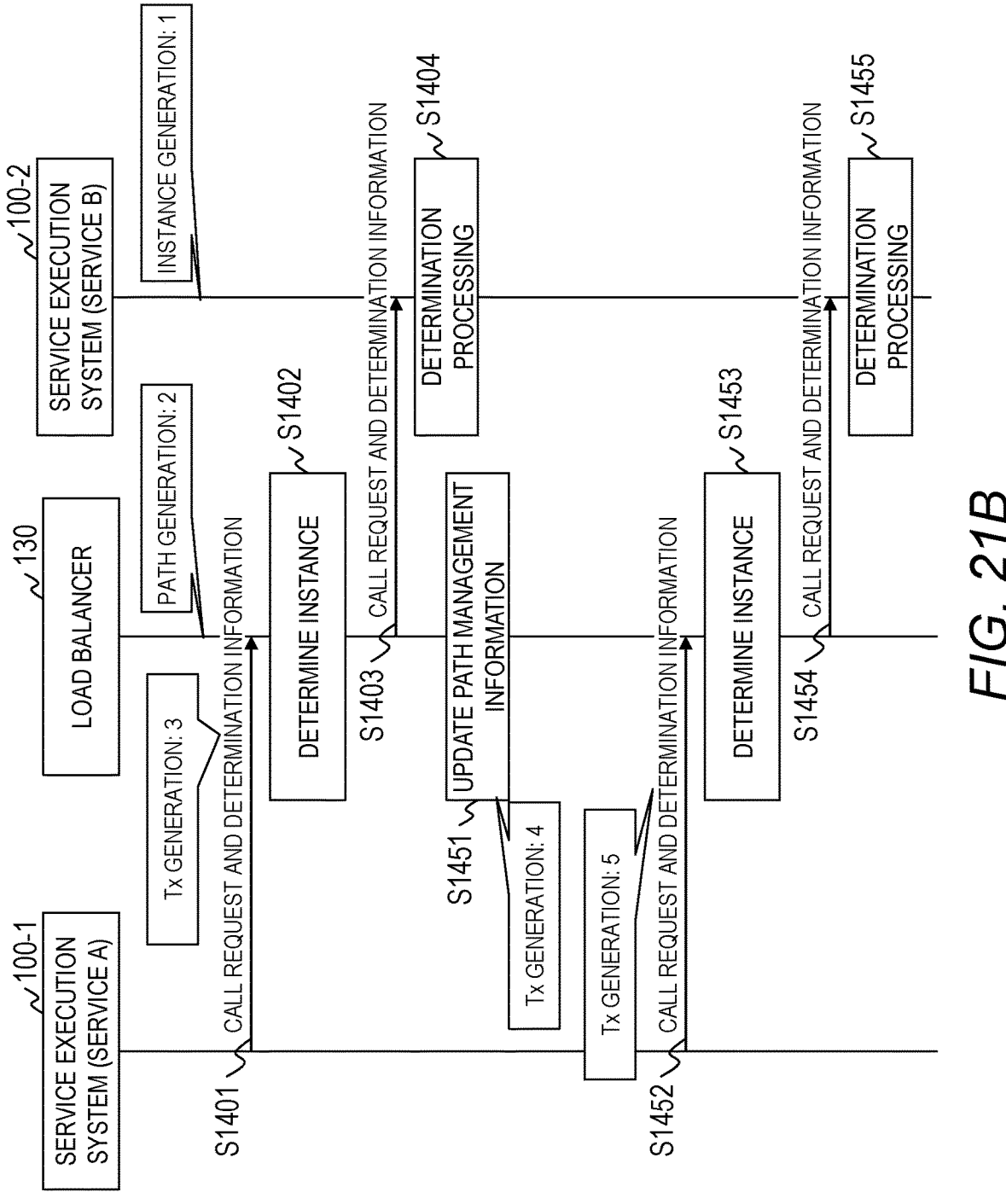
Figures 22A, 22B, 23:
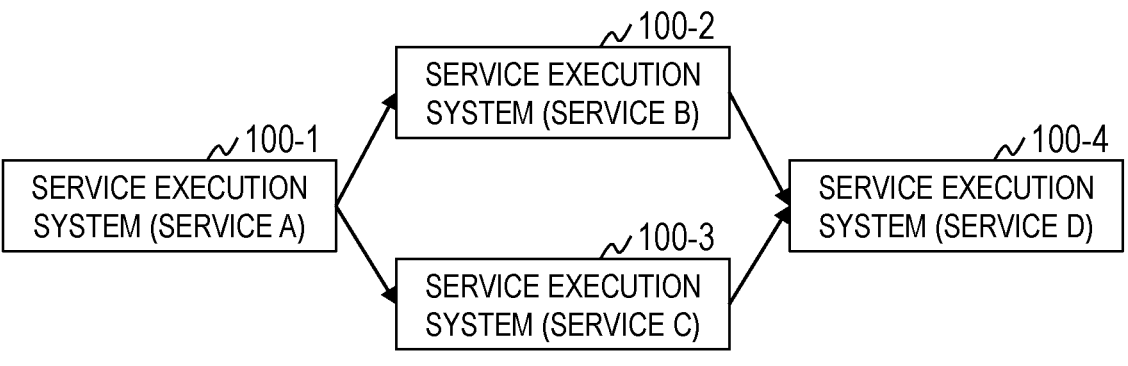
FIG. 22A and FIG. 22B are tables for showing an example of the path management information in the sixth embodiment.
FIG. 23 is a diagram for illustrating an example of the distributed transaction in a seventh embodiment.

A sixth embodiment of this invention is a modification example of the fifth embodiment. FIG. 21A and FIG. 21B are sequence diagrams for illustrating the flow of the processing of the distributed transaction in a system according to the sixth embodiment. FIG. 22A and FIG. 22B are tables for showing an example of path management information 2200 in the sixth embodiment.

First, the sequence diagram of FIG. 21A is described. The service execution system 100-2 sets a predetermined number of instances at the time of the start, obtains a generation number of "1" from the generation management device 120, and manages this generation number as the instance generation. Moreover, the service execution system 100-2 notifies the load balancer 130 of the instance ID. In a case where the load balancer 130 receives the notification from the service execution system 100-2, the load balancer 130 obtains a generation number of "2" from the generation management device 120, and manages this generation number as the path generation. At this time, the load balancer 130 generates the path management information 2200 including an entry having the generation number of "2" stored in a start path generation 2201 and the ID of the instance managed by the service execution system 100-2 stored in an instance ID 2203. A value meaning the infinity is set as an end path generation 2202. For example, the path management information 2200 as shown in FIG. 22A is generated.

The service execution system 100-1 transmits a call request and determination information to the service execution system 100-2 as a result of the start of the distributed transaction (S1401). The call request includes identification information on the service (service A). The determination information includes the generation of the transaction. Specifically, the service execution system 100-1 obtains a generation number of "3" from the generation management device 120, and transmits this generation number as the transaction generation.

In a case where the load balancer 130 receives the call request and the determination information, the load balancer 130 determines the instance ID of a transmission destination (S1402). Specifically, the following processing is executed.

The load balancer 130 identifies a range determined by the start path generation 2201 and the end path generation 2202 of each entry of the path management information 2200 (S1402-1).

The load balancer 130 identifies a range including the transaction generation (S1402-2).

The load balancer 130 selects an instance ID from the instance IDs 2203 of the entries corresponding to the identified range based on a hash distribution algorithm which uses the transaction ID as a key (S1402-3).

The load balancer 130 transmits the call request and the determination information to the determined instance ID of the service execution system 100-2 (S1403).

In a case where the service execution system 100-2 receives the call request and the determination information, the service execution system 100-2 executes the determination processing (S1404). The determination processing in the sixth embodiment is the same as the determination processing in the fourth embodiment, and hence description thereof is omitted.

The service execution system 100-1 transmits the call request and the determination information to the service execution system 100-2 as a result of the start of a new distributed transaction (S1405). The service execution system 100-1 obtains a generation number of "4" from the generation management device 120 and transmits this generation number as the transaction generation.

In a case where the load balancer 130 receives the call request and the determination information, the load balancer 130 determines the instance ID of a transmission destination (S1406). The processing step of Step S1406 is the same as the processing step of Step S1402.

The processing steps of Step S1407 and Step S1408 are the same as the processing steps of Step S1403 and Step S1404, respectively.

The sequence diagram of FIG. 21B is now described. The service execution system 100-2 sets the predetermined number of instances at the time of the start, obtains a generation number of "1" from the generation management device 120, and manages this generation number as the instance generation. Moreover, the service execution system 100-2 notifies the load balancer 130 of the instance ID. In a case where the load balancer 130 receives the notification from the service execution system 100-2, the load balancer 130 obtains a generation number of "2" from the generation management device 120, and manages this generation number as the path generation. At this time, the load balancer 130 generates the path management information 2200 including an entry having the generation number of "2" stored in the start path generation 2201 and the ID of the instance managed by the service execution system 100-2 stored in the instance ID 2203. The value meaning the infinity is set as the end path generation 2202. For example, the path management information 2200 as shown in FIG. 22A is generated.

Processing steps of from Step S1401 to Step S1404 are the same as the corresponding processing steps described with reference to FIG. 21A.

The service execution system 100-2 notifies the instance ID as the number of service instances 110 increases and decreases. The load balancer 130 updates the path management information 2200 (S1451). Specifically, the following processing is executed.

The load balancer 130 searches for an entry which stores the value indicating the infinity in the end path generation 2202 from the path management information 2200 (S1451-1). The load balancer 130 sets a value obtained by subtracting 1 from the obtained generation number as the end path generation 2202 of the retrieved entry.

The load balancer 130 adds an entry to the path management information 2200, sets the obtained generation number as the start path generation 2201 of the added entry, and sets the ID of the notified instance as the instance ID 2203 (S1451-2). The value indicating the infinity is set as the end path generation 2202.

The path management information 2200 is updated as shown in FIG. 22B, for example, by the above-mentioned processing.

The service execution system 100-1 transmits the call request and the determination information to the service execution system 100-2 as a result of the start of a new distributed transaction (S1452). The service execution system 100-1 obtains a generation number of "5" from the generation management device 120 and transmits this generation number as the transaction generation.

In a case where the load balancer 130 receives the call request and the determination information, the load balancer 130 determines the instance ID of a transmission destination (S1453). The processing step of Step S1453 is the same as the processing step of Step S1402. In Step S1453, the instance is determined based on the entry newly added to the path management information 2200.

The processing steps of Step S1454 and Step S1455 are the same as the processing steps of Step S1403 and Step S1404, respectively.

Seventh Embodiment

A seventh embodiment of this invention is a modification example of the third embodiment. FIG. 23 is a diagram for illustrating an example of the distributed transaction in the seventh embodiment.

In the distributed transaction of FIG. 23, a call is executed in a sequence of a service A, a service B, and a service D, and a call is then executed in a sequence of the service A, a service C, and the service D.

Figure 24A:
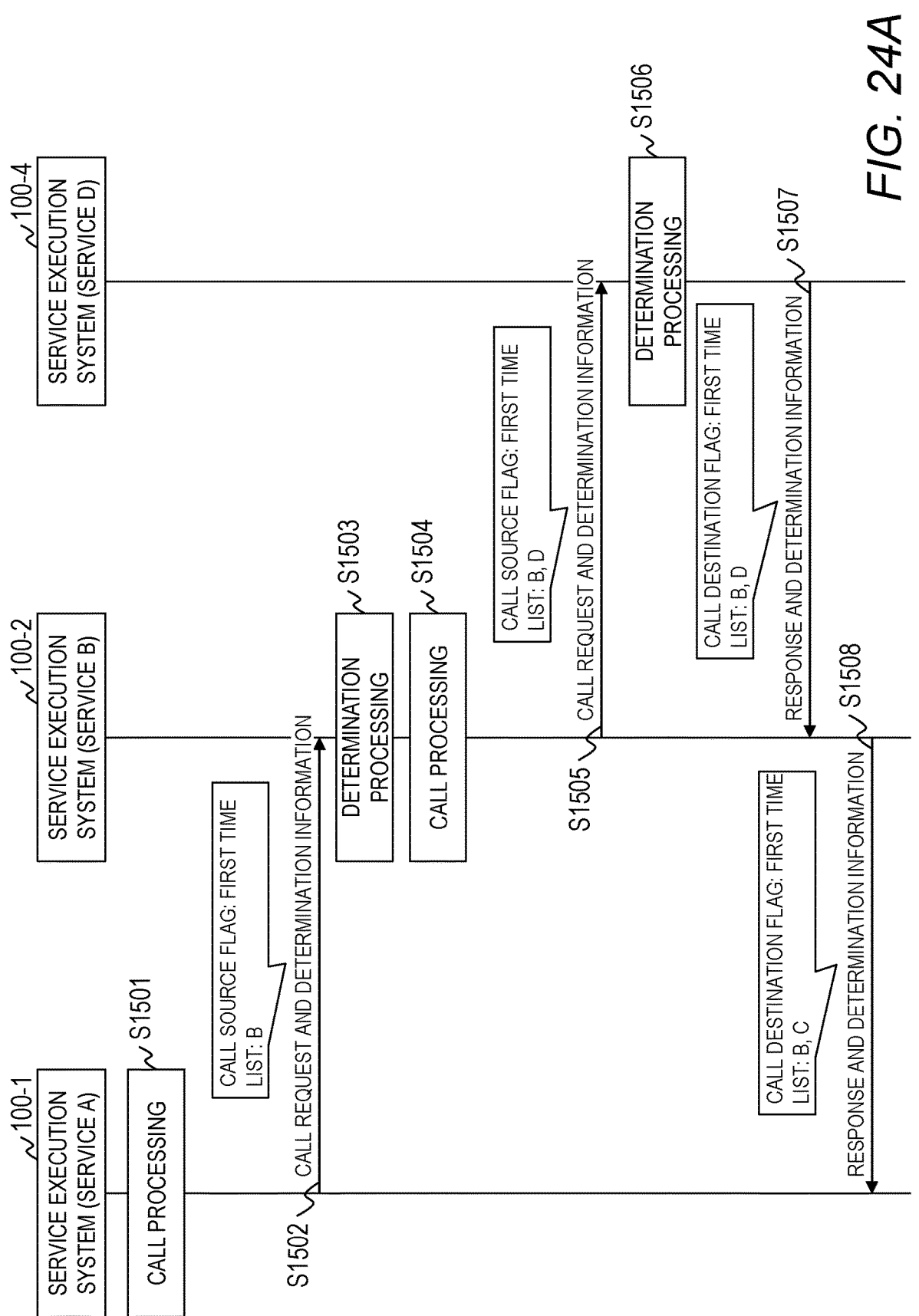
FIG. 24A and FIG. 24B are sequence diagrams for illustrating the flow of the processing of the distributed transaction in the system according to the seventh embodiment.
Figure 24B:
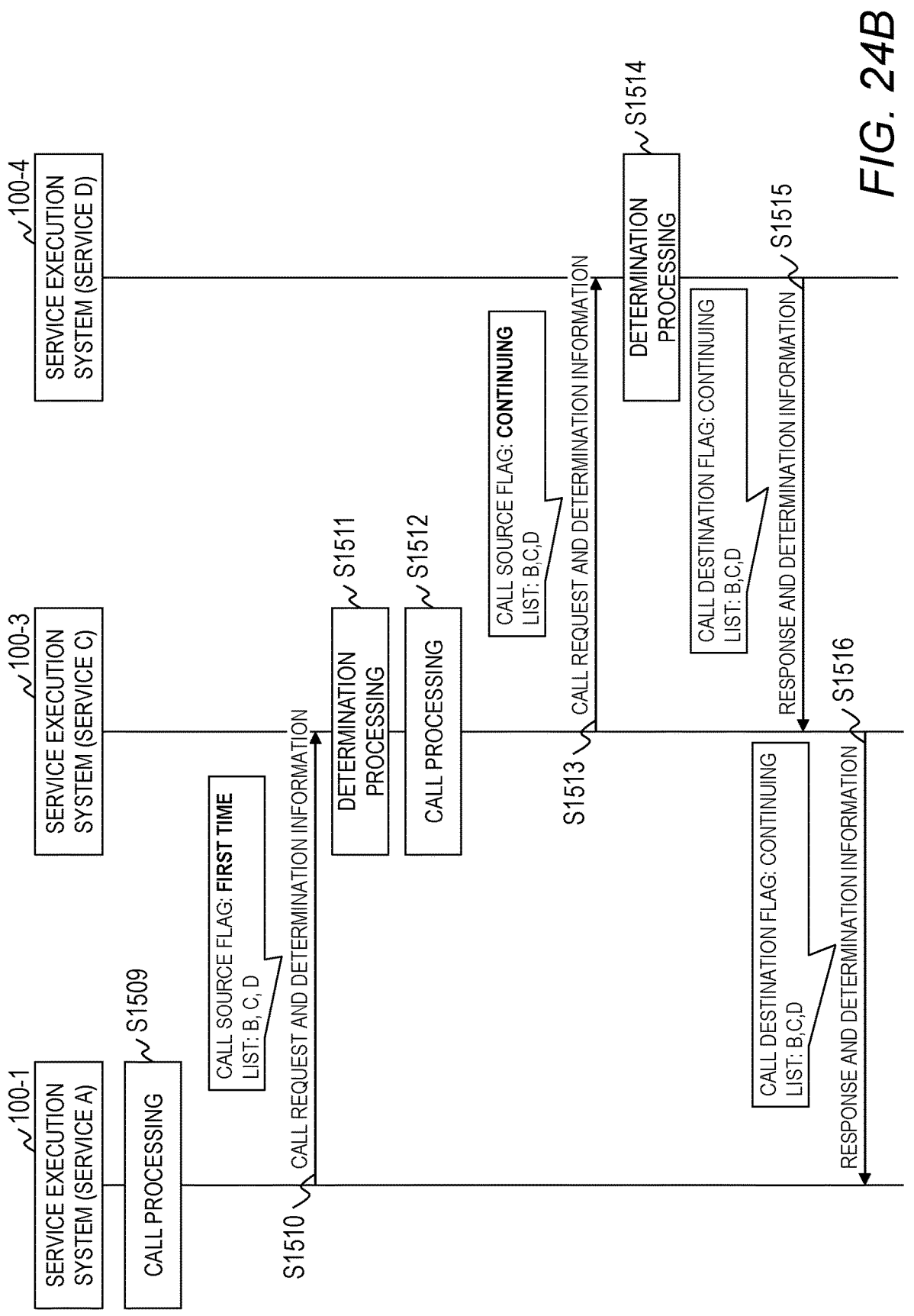

FIG. 24A and FIG. 24B are sequence diagrams for illustrating the flow of the processing of the distributed transaction in a system according to the seventh embodiment.

The service execution system 100-1 executes the call processing as a result of the start of the distributed transaction (S1501). In the call processing, the call flag and a service list are set. Details of the call processing are described later. In this case, the call flag of "first time" is set, and the service list in which the service B is registered is set.

The service execution system 100-1 transmits the call request and the determination information to the service execution system 100-2 (S1502). The call request includes the identification information on the distributed transaction. In the seventh embodiment, the call flag and the service list are transmitted as the determination information.

In a case where the service execution system 100-2 receives the call request and the determination information, the service execution system 100-2 stores the service list included in the determination information, and then executes the determination processing for determining whether or not the rollback of the distribution transaction is required (S1503). Details of the determination processing are the same as those in the third embodiment. It is determined here that the rollback is not required.

The service execution system 100-2 determines that the call for a service execution system 100-4 is required after the execution of the service, and executes the call processing (S1504). In this case, the call flag of "first time" is set, and a service list in which the service B and the service D are registered is set.

The service execution system 100-2 transmits the call request and the determination information to the service execution system 100-4 (S1505). The call request includes the identification information on the distributed transaction. In Step S1505, the service list in which the service B and the service D to be executed by the service execution system 100-4 are registered is transmitted.

In a case where the service execution system 100-4 receives the call request and the determination information, the service execution system 100-4 stores the service list included in the determination information, and then executes the determination processing (S1506). It is determined here that the rollback is not required.

The service execution system 100-4 transmits the response and the determination information to the service execution system 100-2 after the execution of the service (S1507).

In a case where the service execution system 100-2 receives the response and the determination information, the service execution system 100-2 records the call flag and the service list included in the determination information, and then transfers the response to the service execution system 100-1 (S1508).

In a case where the service execution system 100-1 receives the response and the determination information, the service execution system 100-1 records the call flag and the service list included in the determination information. After that, the service execution system 100-1 executes the call processing in order to transmit the call request to the service execution system 100-3 (S1509). In this case, the call flag of "first time" is set, and a service list in which the service B, the service D, and the service C to be executed by the service execution system 100-3 are registered is set.

The service execution system 100-1 transmits the call request and the determination information to the service execution system 100-3 (S1510).

In a case where the service execution system 100-3 receives the call request and the determination information, the service execution system 100-3 stores the service list included in the determination information, and then executes the determination processing for determining whether or not the rollback of the distribution transaction is required (S1511). It is determined here that the rollback is not required.

The service execution system 100-3 determines that the call for the service execution system 100-4 is required after the execution of the service, and executes the call processing (S1512). In this case, the call flag of "continuing" is set, and a service list in which the service B, the service C, and the service D are registered is set. The service execution system 100-3 transmits the call request and the determination information to the service execution system 100-4 (S1513).

In a case where the service execution system 100-4 receives the call request and the determination information, the service execution system 100-4 stores the service list included in the determination information, and then executes the determination processing (S1514). It is determined here that the rollback is not required.

The service execution system 100-4 transmits the response and the determination information to the service execution system 100-3 after the execution of the service (S1515).

In a case where the service execution system 100-3 receives the response and the determination information, the service execution system 100-3 records the call flag and the service list included in the determination information, and then transfers the response to the service execution system 100-1 (S1516).

In a case where the service execution system 100-1 receives the response and the determination information, the service execution system 100-1 records the call flag and the service list included in the determination information.

In a case where the call processing is not to be executed, the call flag of "first time" is transmitted from the service execution system 100-3 to the service execution system 100-4. At this time, the service execution system 100-4 has already been called from the service execution system 100-2 in the same distributed transaction. Thus, the service execution system 100-4 determines that the rollback is required. In the seventh embodiment, in order to prevent the above-mentioned rollback, the service list for recognizing the call situation of the service in the distributed transaction is included in the determination information, to thereby adjust the call flag.

Figure 25:
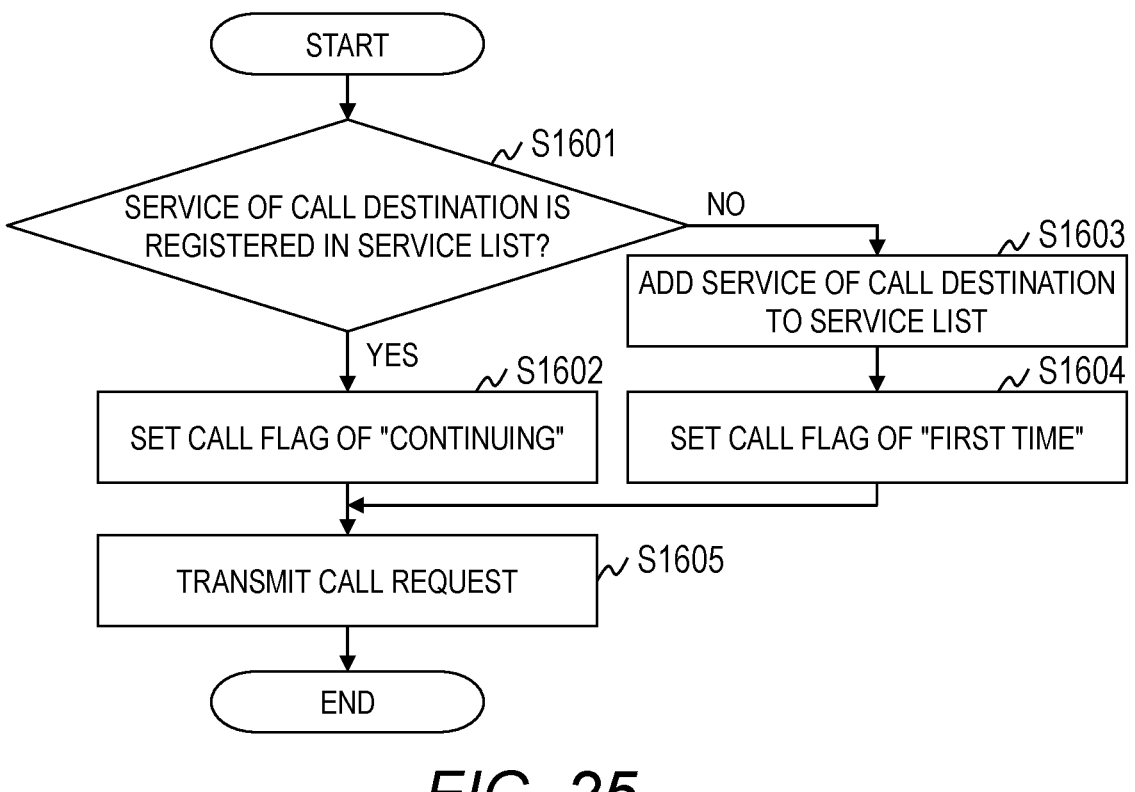
FIG. 25 is a flowchart for illustrating an example of call processing executed by the service execution system in the seventh embodiment.

FIG. 25 is a flowchart for illustrating an example of the call processing executed by the service execution system 100 in the seventh embodiment.

The transaction control module 112 determines whether or not the service of the call destination is registered in the service list stored in the determination information storage module 114 (S1601).

In the service execution system 100 at the start point, a service list does not exist in the determination information storage module 114 at the start time of the distributed transaction. Thus, the service execution system 100 at the start point generates an empty service list in the determination information storage module 114, and the process proceeds to Step S1603.

In a case where the service of the call destination is registered in the service list, the transaction control module 112 sets the call flag of "continuing" (S1602). The transaction control module 112 transmits the call request together with the call flag of "continuing" and the service list stored in the determination information storage module 114 as well as the determination information to the service execution system 100 which executes the service of the call target (S1605).

In a case where the service of the call destination is not registered in the service list, the transaction control module 112 registers the service of the call destination in the service list stored in the determination information storage module 114 (S1603).

The transaction control module 112 sets the call flag of "first time" (S1604). The transaction control module 112 transmits the call request together with the call flag of "first time" and the service list stored in the determination information storage module 114 as well as the determination information to the service execution system 100 which executes the service of the call target (S1605).

According to the seventh embodiment, it is possible to detect the inconsistency of the data also for the distributed transaction which calls the same service via a plurality of paths.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a nonvolatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system comprising a plurality of service execution systems each configured to execute a service for implementing an application that executes a distributed transaction, at least one of the plurality of service execution systems being configured to generate determination information for determining whether rollback of the distributed transaction is required and to transmit the determination information to another one of the plurality of service execution systems, and the another one of the plurality of service execution systems that has received the determination information being configured to determine, through use of the determination information, whether the rollback of the distributed transaction is required, wherein one of the plurality of service execution systems that has received a call request for instructing the execution of the service is configured to generate the determination information, and wherein one of the plurality of service execution systems that executes the service being a start point of the distributed transaction is configured to obtain the determination information from another one of the plurality of service execution systems that executes the service relating to the distributed transaction, and to determine whether the rollback of the distributed transaction is required.

2. The computer system according to claim 1, wherein the one of the plurality of service execution systems that has received the call request is configured to execute the service and to generate, as the determination information, a call flag indicating a call state of the one of the plurality of service execution systems, and wherein the one of the plurality of service execution systems that executes the service being the start point of the distributed transaction is configured to:

store the call flag;

determine whether two or more call flags indicating that the call request is received for the first time exist for each of the plurality of service execution systems that executes the service relating to the distributed transaction; and determine that the rollback of the distributed transaction is required in a case where at least one service execution system having two or more call flags each indicating that the call request is received for the first time exists.

3. The computer system according to claim 2, wherein the one of the plurality of service execution systems that has received the call request is configured to:

generate the call flag indicating a first call as the determination information in a case where the call request is received for the first time; and generate the call flag indicating a second or subsequent call as the determination information in a case where the call request is received for the second or subsequent time.

4. The computer system according to claim 1,
wherein one of the plurality of service execution systems is configured to set the number of times of a start of the service when the service is started, wherein the one of the plurality of service execution systems that has received the call request is configured to execute the service, and to generate the number of times of the start of the service as the determination information, and wherein the one of the plurality of service execution systems that executes the service being the start point of the distributed transaction is configured to:

store the number of times of the start of the service;

determine whether the number of times of the start of the service received the previous time and the number of times of the start of the service received this time match each other for each of the plurality of service execution systems that executes the service relating to the distributed transaction; and determine that the rollback of the distributed transaction is required in a case where at least one service execution system having the number of times of the start of the service received the previous time and the number of times of the start of the service received this time failing to match each other exists.

5. The computer system according to claim 4,
wherein each of the plurality of service execution systems includes a plurality of instances that execute the service, wherein the one of the plurality of service execution systems that has received the call request is configured to generate the number of times of the start of the service and identification information on one of the plurality of instances as the determination information, and wherein the one of the plurality of service execution systems that executes the service being the start point of the distributed transaction is configured to:

determine whether a set of the number of times of the start of the service and the identification information on the one of the plurality of instances received the previous time and a set of the number of times of the start of the service and the identification information on the one of the plurality of instances received this time match each other for each of the plurality of service execution systems that executes the service relating to the distributed transaction; and determine that the rollback of the distributed transaction is required in a case where at least one service execution system having the set of the number of times of the start of the service and the identification information on the one of the plurality of instances received the previous time and the set of the number of times of the start of the service and the identification information on the one of the plurality of instances received this time failing to match each other exists.

6. A computer system comprising a plurality of service execution systems each configured to execute a service for implementing an application that executes a distributed transaction, at least one of the plurality of service execution systems being configured to generate determination information for determining whether rollback of the distributed transaction is required and to transmit the determination information to another one of the plurality of service execution systems, and the another one of the plurality of service execution systems that has received the determination information being configured to determine, through use of the determination information, whether the rollback of the distributed transaction is required, wherein one of the plurality of service execution systems that executes the service being a start point of the distributed transaction is configured to:

generate the determination information; and transmit, to another one of the plurality of service execution systems, a call request for instructing the execution of the service together with the determination information, and wherein the another one of the plurality of service execution systems that has received the call request is configured to determine, based on the determination information, whether the rollback of the distributed transaction is required.

7. The computer system according to claim 6,
wherein the one of the plurality of service execution systems that executes the service being the start point of the distributed transaction is configured to:

generate, as the determination information, a call flag indicating a call state of the another one of the plurality of service execution systems; and update the call flag in a case where a response to the call request is received from the another one of the plurality of service execution systems, and wherein the another one of the plurality of service execution systems that has received the call request is configured to:

determine, in a case where the call flag is not recorded, whether the received call flag is the call flag indicating that the service is to be called for the first time and determine that the rollback of the distributed transaction is required in a case where the received call flag is not the call flag indicating that the service is to be called for the first time;

determine, in a case where the call flag is recorded, whether the call flag received the previous time and the call flag received this time match each other and determine that the rollback of the distributed transaction is required in a case where the call flag received the previous time and the call flag received this time fail to match each other; and record the received call flag in a case where the rollback of the distributed transaction is not required.

8. The computer system according to claim 6,
wherein the one of the plurality of service execution systems that executes the service being the start point of the distributed transaction is configured to generate, as the determination information, a call flag indicating a call state of one of the plurality of service execution systems of a call destination and a list registering identification information on the service to be executed by the one of the plurality of service execution systems of the call destination, wherein in case where one of the plurality of service execution systems receives the call request, the one of the plurality of service execution systems is configured to execute:

processing of recording the list;

processing of determining, in a case where the call flag is not recorded, whether the received call flag is the call flag indicating that the service is to be called for the first time and determining that the rollback of the distributed transaction is required in a case where the received call flag is not the call flag indicating that the service is to be called for the first time, and determining, in a case where the call flag is recorded, whether the call flag received the previous time and the call flag received this time match each other and determining that the rollback of the distributed transaction is required in a case where the call flag received the previous time and the call flag received this time fail to match each other; and processing of recording the received call flag in a case where the rollback of the distributed transaction is not required, and wherein in a case where the one of the plurality of service execution systems newly transmits the call request, the one of the plurality of service execution systems is configured to execute:

processing of determining whether identification information on the one of the plurality of service execution systems of the call destination is included in the list included in the determination information received together with the received call request; and processing of setting, in a case where the identification information on the one of the plurality of service execution systems of the call destination is included in the list, the call flag indicating that the call has been executed and transmitting the call request together with the determination information formed of the call flag and the received list, and registering, in a case where the identification information on the one of the plurality of service execution systems of the call destination is not included in the list, the identification information on the service to be executed by the one of the plurality of service execution systems of the call destination in the stored list and transmitting the call request together with the determination information formed of the received call flag and the list.

9. The computer system according to claim 6, wherein each of the plurality of service execution systems is configured to set a generation of the service corresponding to the number of times of a start of the service when the service is started, wherein the one of the plurality of service execution systems that executes the service being the start point of the distributed transaction is configured to generate a generation of the distributed transaction as the determination information, and wherein the another one of the plurality of service execution systems that has received the call request is configured to determine whether the rollback of the distributed transaction is required based on processing of comparing the generation of the service and the generation of the distributed transaction.

10. The computer system according to claim 9, further comprising a load balancing module configured to control a call for the service in the distributed transaction based on path information, wherein the load balancing module is configured to:

manage the path information and the generation of the distributed transaction in association with each other;

record, in a case where the call request is received from the one of the plurality of service execution systems that executes the service being the start point of the distributed transaction, the generation of the distributed transaction included in the call request and the newest path information in association with each other; and control transfer of the call request through use of the path information associated with the generation of the distributed transaction included in the call request.

11. The computer system according to claim 9, wherein each of the plurality of service execution systems includes a plurality of instances that execute the service, wherein the computer system further comprises a load balancing module configured to control a call for the service in the distributed transaction, and wherein the load balancing module is configured to:

manage an association between identification information on one of the plurality of instances and a range of a generation of path control based on a hash distribution algorithm;

generate a new association in a case where a notification relating to an increase or a decrease in the number of instances is received from one of the plurality of service execution systems; and identify, in a case where the call request is received from the one of the plurality of service execution systems that executes the service being the start point of the distributed transaction, the range including the generation of the distributed transaction included in the call request, and select one piece of identification information from pieces of identification information on instances associated with the identified range based on the hash distribution algorithm, to thereby control transfer of the call request.

12. A control method for a distributed transaction of a computer system including a plurality of service execution systems each configured to execute a service for implementing an application that executes a distributed transaction, the control method comprising:

a first step of generating, by at least one of the plurality of service execution systems, determination information for determining whether rollback of the distributed transaction is required and transmitting the determination information to another one of the plurality of service execution systems; and a second step of determining, by the another one of the plurality of service execution systems that has received the determination information, whether the rollback of the distributed transaction is required through use of the determination information, wherein the first step includes a step of generating the determination information by one of the plurality of service execution systems that has received a call request for instructing the execution of the service, and wherein the second step includes the steps of:

obtaining, by one of the plurality of service execution systems that executes the service being a start point of the distributed transaction, the determination information from another one of the plurality of service execution systems that executes the service relating to the distributed transaction; and determining, by the one of the plurality of service execution systems that executes the service being the start point of the distributed transaction, whether the rollback of the distributed transaction is required based on the determination information.

13. The control method for a distributed transaction according to claim 12, wherein the first step includes the steps of:

generating the determination information by one of the plurality of service execution systems that executes the service being a start point of the distributed transaction; and transmitting, by the one of the plurality of service execution systems that executes the service being the start point of the distributed transaction, to another one of the plurality of service execution systems, a call request for instructing the execution of the service together with the determination information, and wherein the second step includes a step of determining, by the another one of the plurality of service execution systems that has received the call request, whether the rollback of the distributed transaction is required based on the determination information.

\*   \*   \*   \*   \*